(12) United States Patent
Zhu et al.

(10) Patent No.: US 12,156,272 B2
(45) Date of Patent: Nov. 26, 2024

(54) UPLINK (UL) RETRANSMISSION AND RADIO LINK FAILURE (RLF) RECOVERY IN A MULTI-HOP RELAY NETWORK

(71) Applicant: Apple Inc., Cupertino, CA (US)

(72) Inventors: Jing Zhu, Portland (CA); Murali Narasimha, Lake Oswego, CA (US)

(73) Assignee: Apple Inc., Cupertino, CA (US)

( * ) Notice: Subject to any disclaimer, the term of this patent is extended or adjusted under 35 U.S.C. 154(b) by 383 days.

(21) Appl. No.: 17/433,524

(22) PCT Filed: Feb. 25, 2020

(86) PCT No.: PCT/US2020/019746
§ 371 (c)(1),
(2) Date: Aug. 24, 2021

(87) PCT Pub. No.: WO2020/176537
PCT Pub. Date: Sep. 3, 2020

(65) Prior Publication Data
US 2022/0159768 A1    May 19, 2022

(51) Int. Cl.
*H04W 76/19*    (2018.01)
*H04L 1/1607*    (2023.01)
(Continued)

(52) U.S. Cl.
CPC .......... *H04W 76/19* (2018.02); *H04L 1/1642* (2013.01); *H04W 88/14* (2013.01); *H04W 92/24* (2013.01)

(58) Field of Classification Search
None
See application file for complete search history.

(56) References Cited

U.S. PATENT DOCUMENTS

2014/0010147 A1* 1/2014 Cao ................. H04L 1/1867
370/315
2016/0234714 A1  8/2016 Basu Mallick et al.
(Continued)

FOREIGN PATENT DOCUMENTS

| EP | 2685654 A1 | 1/2014 |
| EP | 2838291 A1 | 2/2015 |
| WO | WO 2018/175817 A1 | 9/2018 |

OTHER PUBLICATIONS

Search Report and Written Opinion for PCT Appl. No. PCT/US2020/019746, Mailed Jun. 12, 2020, 12 pages.
(Continued)

*Primary Examiner* — Mariela Vidal Carpio
(74) *Attorney, Agent, or Firm* — Sterne, Kessler, Goldstein & Fox P.L.L.C.

(57) ABSTRACT

This disclosure provides techniques for recovery techniques to address link failure in multi-hop backhaul relay network. For example, a central unit (CU) node receives, uplink transmissions originating from a user equipment (UE) via a backhaul relay including a first distributed unit (DU) node and a second DU node. The CU then receives a first UL status message associated with a link failure between the first DU node the second DU node. Then the CU generates a second UL status message indicating a sequence number (SN) of a lost packet caused by the link failure or a SN of a last successfully received packet before the link failure, and transmits the second UL status message to the first DU node.

18 Claims, 17 Drawing Sheets

(51) Int. Cl.
*H04W 88/14* (2009.01)
*H04W 92/24* (2009.01)

(56) References Cited

U.S. PATENT DOCUMENTS

| | | | |
|---|---|---|---|
| 2019/0394823 A1* | 12/2019 | Jo | B60W 50/14 |
| 2020/0252847 A1* | 8/2020 | Park | H04W 80/02 |
| 2020/0344664 A1* | 10/2020 | Tang | H04W 40/22 |
| 2021/0084506 A1* | 3/2021 | Kimba Dit Adamou | H04W 24/04 |
| 2021/0127293 A1* | 4/2021 | Hong | H04W 24/08 |
| 2021/0184994 A1* | 6/2021 | Wang | H04L 1/1864 |
| 2021/0219183 A1* | 7/2021 | Huang | H04W 28/0236 |
| 2021/0377840 A1* | 12/2021 | Zhu | H04W 40/02 |
| 2022/0053588 A1* | 2/2022 | Shaheen | H04W 76/19 |
| 2022/0141910 A1* | 5/2022 | Muhammad | H04L 45/28 370/329 |
| 2022/0151006 A1* | 5/2022 | Muhammad | H04W 76/19 |

OTHER PUBLICATIONS

ZTE, Sanechips, "Procedures for backhaul link failure and recovery," 3GPP TSG RAN WG3 Meeting #102, R3-186421, downloaded from http://www.3gpp.org/ftp/Meetings%5F3GPP%5FSYNC/RAN3/Docs/R3%2D186421%2Ezip, Spokane, USA, 2018, 9 pages.
Ericsson, "Recovery from Link Failure in IAB Networks," 3GPP TSG RAN WG3 Meeting #103, R3-190363, downloaded from http://www.3gpp.org/ftp/tsg%5Fran/WG3%5FIu/TSGR3%5F103/Docs/R3%2D190363%2Ezip, Athens, Greece, 2019, 5 pages.

* cited by examiner

UPLINK (UL) RETRANSMISSION AND RADIO LINK FAILURE (RLF) RECOVERY IN A MULTI-HOP RELAY NETWORK

CROSS REFERENCE TO RELATED APPLICATIONS

This application is a U.S. National Phase Entry of International Application No. PCT/US2020/019746, filed Feb. 25, 2020 which claims the benefit of U.S. Provisional Application No. 62/810,123, filed Feb. 25, 2019, both of which are hereby incorporated by reference in their entireties.

FIELD

Various embodiments generally may relate to the field of wireless communications.

SUMMARY

Some embodiments of this disclosure include systems, apparatuses, methods, and computer-readable media for uplink recovery and retransmission due to radio link failure in a multi-hop relay backhaul network.

Some embodiments are directed to a method of uplink (UL) recovery in a 5G wireless network. The method includes receiving, at a central unit (CU) node, uplink transmissions originating from a user equipment (UE) via a backhaul relay including a first distributed unit (DU) node and a second. DU node, and receiving, at the CU node, a first UL status message associated with a link failure between the first DU node the second DU node. The method further includes generating, at the CU node, a second UL status message indicating a sequence number (SN) of a lost packet caused by the link failure or a SN of a last successfully received packet before the link failure, and transmitting, by the CU node, the second UL status message to the first DU node.

In embodiments, the second UL status message includes instructions for the first DU node to send subsequent UL transmissions to a third DU node, instead of the second DU node, for further upload to the CU.

In embodiments, the method further includes receiving the subsequent UL transmissions from the third DU node.

In embodiments, the second UL status message is transmitted to the first DU node via the third DU node.

In embodiments, the first UL status message is received from the second DU node and includes at least one of the SN of the lost packet caused by the link failure or the SN of the last successfully received SN before the link failure.

In embodiments, at least one of the first UL message or the second UL message is based on a F1 interface protocol associated with 5G.

In embodiments, the second UL status message further includes a UL transmission timer that indicates a storage tune that the first DL node should store UL transmissions from the UE.

Some embodiments include a non-transitory computer readable medium having instructions stored thereon that, when executed by one or more processors of a central unit (CU) node, cause the CU node to perform operations. The operations include receiving, at the central unit (CU) node, uplink transmissions originating from a user equipment (UE) via a backhaul relay including a first distributed unit (DU) node and a second DU node, and receiving, at the CU node, a first UL status message associated with a link failure between the first DU node the second DU node. The operations further include generating a second UL status message indicating a sequence number (SN) of a lost packet caused by the link failure or a SN of a last successfully received packet before the link failure, and transmitting, by the CU node, the second UL status message to the first DU node.

In embodiments, the second UL status message includes instructions for the first DU node to send subsequent UL transmissions to a third DU node, instead of the second DU node, for further upload to the CU.

In embodiments, the operations further include receiving the subsequent UL transmissions from the third DU node.

In embodiments, the second UL status message is transmitted to the first DU node via the third DU node.

In embodiments, the first UL status message is received from the second DU node and includes at least one of the SN of the lost packet caused by the link failure or the SN of the last successfully received SN before the link failure.

In embodiments, at least one of the first UL message or the second UL message is based on a F1 interface protocol associated with 5G.

In embodiments, the second UL status message further includes a UL transmission timer that indicates a storage time that the first DL node should store UL transmissions from the UE.

Some embodiments are directed to an apparatus in a central unit (CU) node. The apparatus includes radio front end circuitry and processor circuitry coupled to the radio front end circuitry. The radio front end circuitry performs wireless communication over a wireless network. The processor circuitry, coupled to the radio front end circuitry, receives uplink transmissions originating from a user equipment (UE) via a backhaul relay including a first distributed unit (DU) node and a second DU node, and further receives a first UL status message associated with a link failure between the first DU node the second DU node. In response, the processor circuitry further generates a second UL status message indicating a sequence number (SN) of a lost packet caused by the link failure or a SN of a last successfully received packet before the link failure, and transmits, using the radio front end circuitry, the second UL status message to the first DU node.

In embodiments, the second UL status message includes instructions for the first DU node to send subsequent UL transmissions to a third DU node, instead of the second DU node, for further upload to the CU.

In embodiments, the processor circuitry further receives the subsequent UL transmissions from the third DU node.

In embodiments, the second UL status message is transmitted to the first DU node via the third DU node.

In embodiments, the first UL status message is received from the second DU node and includes at least one of the SN of the lost packet caused by the link failure or the SN of the last successfully received SN before the link failure.

In embodiments, at least one of the first UL message or the second UL message is based on a F1 interface protocol associated with 5G.

In embodiments, the second UL status message further includes a UL transmission tuner that indicates a storage time that the first DL node should store UL transmissions from the UE.

BRIEF DESCRIPTION OF THE DRAWINGS/FIGURES

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Figure 1:
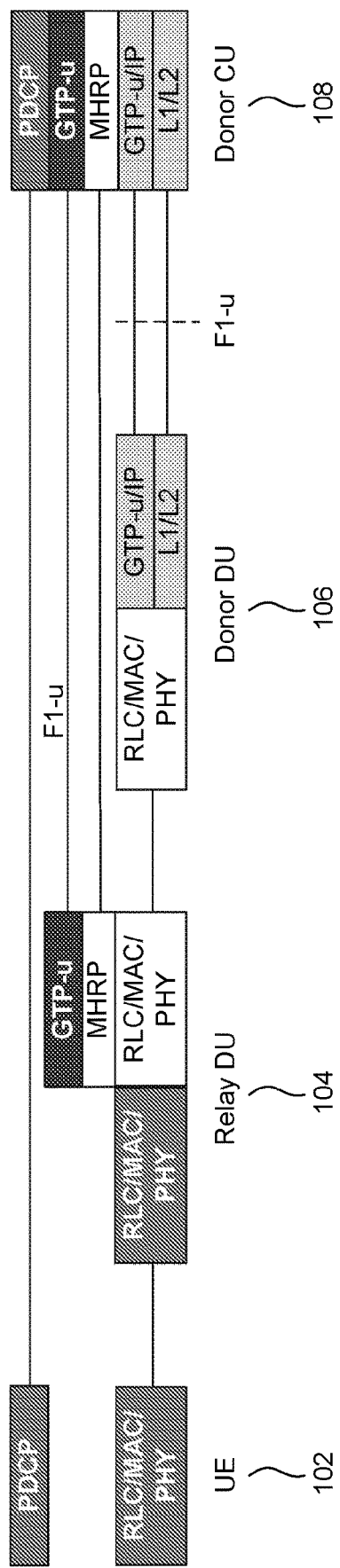
FIG. 1 depicts an e2e data-plane protocol stack in a multi-hop relay network with DU/CU splitting in accordance with some embodiments.

FIG. 1 shows the e2e data-plane protocol stack in a multi-hop relay network with central unit (CU) and distributed unit (DU) (CU/DU) splitting. UE data traffic are multiplexed by an adaptation protocol, e.g. Multi-Hop Relay Protocol (MHRP), and delivered over the F1-U interface between Donor central unit (CU) 102 and Donor distributed unit (DU) 106, and then over the layer 2 forwarding between Donor DU 106 and Relay DU 104. Optionally, another (GTP-u based) F1-u interface may be established between Relay DU 104 and Donor CU 108 to support centralized retransmission if the link between UE and a Relay DU is temporarily lost due to fading or blockage.

Figure 2:
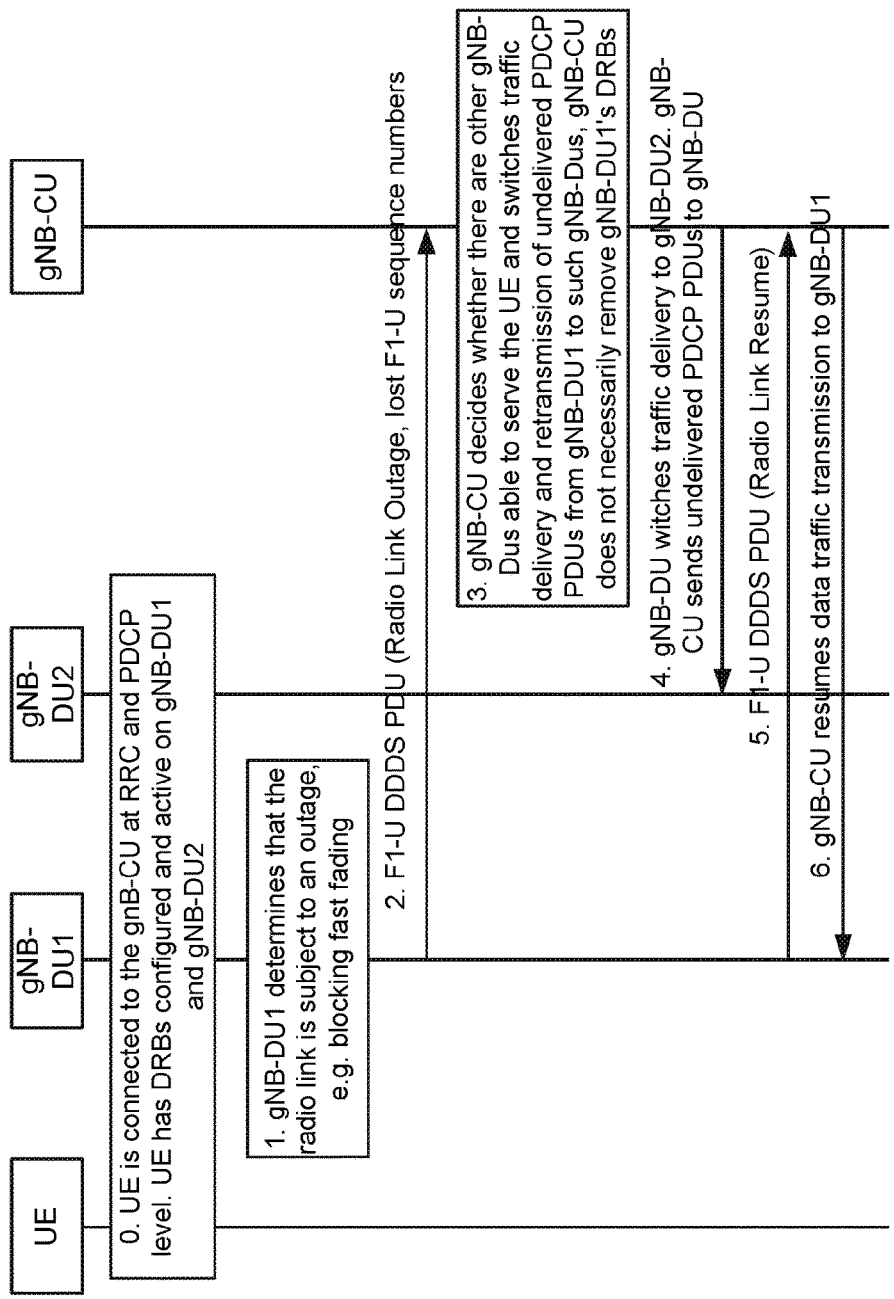
FIG. 2 depicts a procedure of centralized retransmission in intra-gNB CU scenarios in accordance with some embodiments.

FIG. 2 shows the procedure of centralized retransmission in intra-gNB CU scenarios (see, for example, TS 38.401, v15.4.0 (2019-01). However, this procedure won't work if the link between a relay DU and its parent node is subject to outage.

Embodiments describe a procedure to support centralized uplink retransmission in a multi-hop relay network. An aspect is to let the donor node send a new F1-U message, UDDS (Uplink Data Delivery Status) to the serving IAB node. The F1-U UDDS PDU will carry the lost F1-U sequence number or the last successfully delivered F1-U sequence number, which can then be used by the relay node to decide which PDCP packets are lost and should be retransmitted over the new path.

Figure 3:
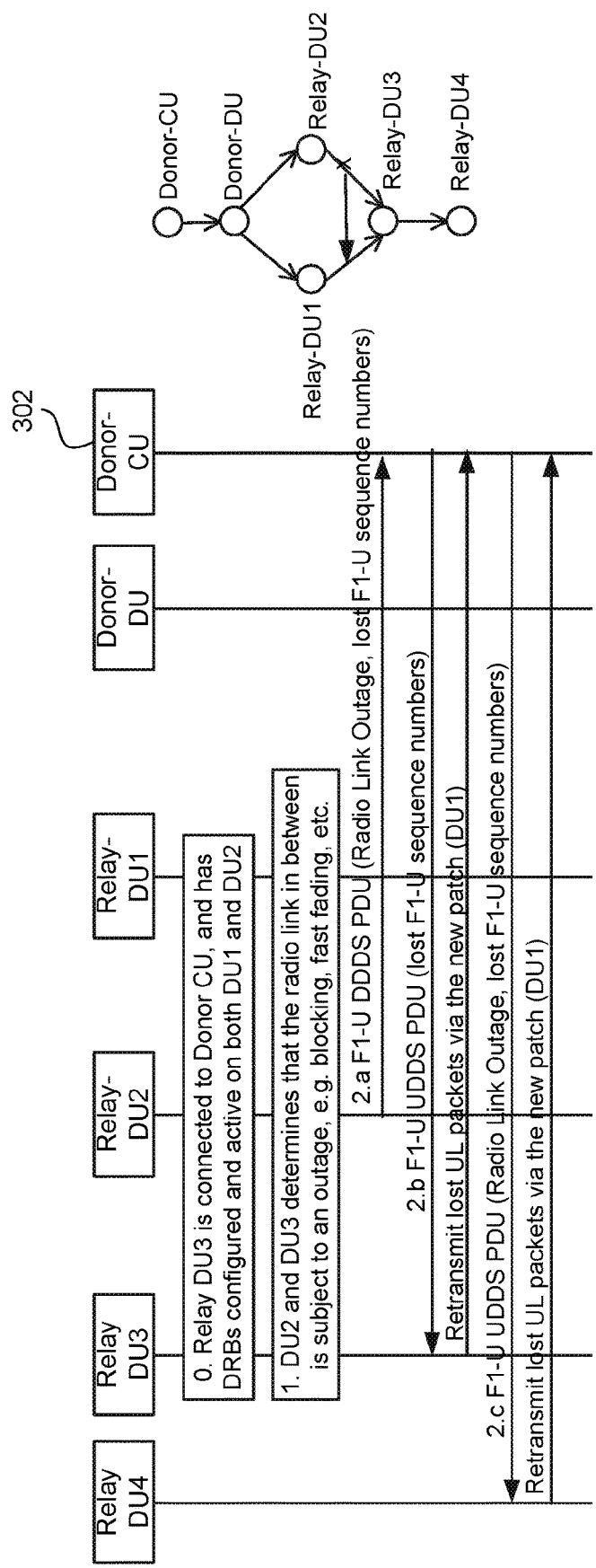
FIG. 3 depicts the proposed uplink retransmission procedure during the backhaul link failure in accordance with some embodiments.

FIG. 3 shows the proposed uplink retransmission procedure during the backhaul link failure. Here, embodiments add the following new steps right after the Donor node 302 detects that the Relay node (e.g. DU3) lost its backhaul link (e.g. DU2) and switched to a new path (e.g. DU1). Referring to FIG. 3, steps:

0: Relay DU3 is connected to donor CU 302 using data radio bearers (DRBs) for both DU2 and DU1.

1: DU2 and DU3 determine that their radio link connection has failed.

2.a: DU2 sends UDDS message to CU 302 including lost packet sequence numbers due to radio link failure and/or last successfully received packet SN prior to radio link failure 2.b: The donor node 302 detects a backhaul link change for DU3, and sends the F1-U UDDS PDU message over the new path (e.g. via DU1) to DU3 for reporting lost packets or last successfully delivered PDCP PDUs for the UEs that it serves. The UDDS message can also include instructions for DU3 to send subsequent uplink data packets using DU1 as a backhaul path, instead of DU2.

2.c: the donor node 302 detects backhaul link change for DU 4, and sends the F1-U UDDS PDU message over the new path (via DU1) to report packet loss or last successfully delivered PDCP PDUs for the UEs that it serves. This step will continue for all the downstream relay nodes that have been impacted by the lost backhaul link using DU2.

In response, the relay node (e.g. DU3, DU4) will retransmit lost PDCP PDUs (or F1-U PDU) towards the donor node 302 via the new path (DU1) according to their F1-U UDDS PDU message respectively.

Figure 4:
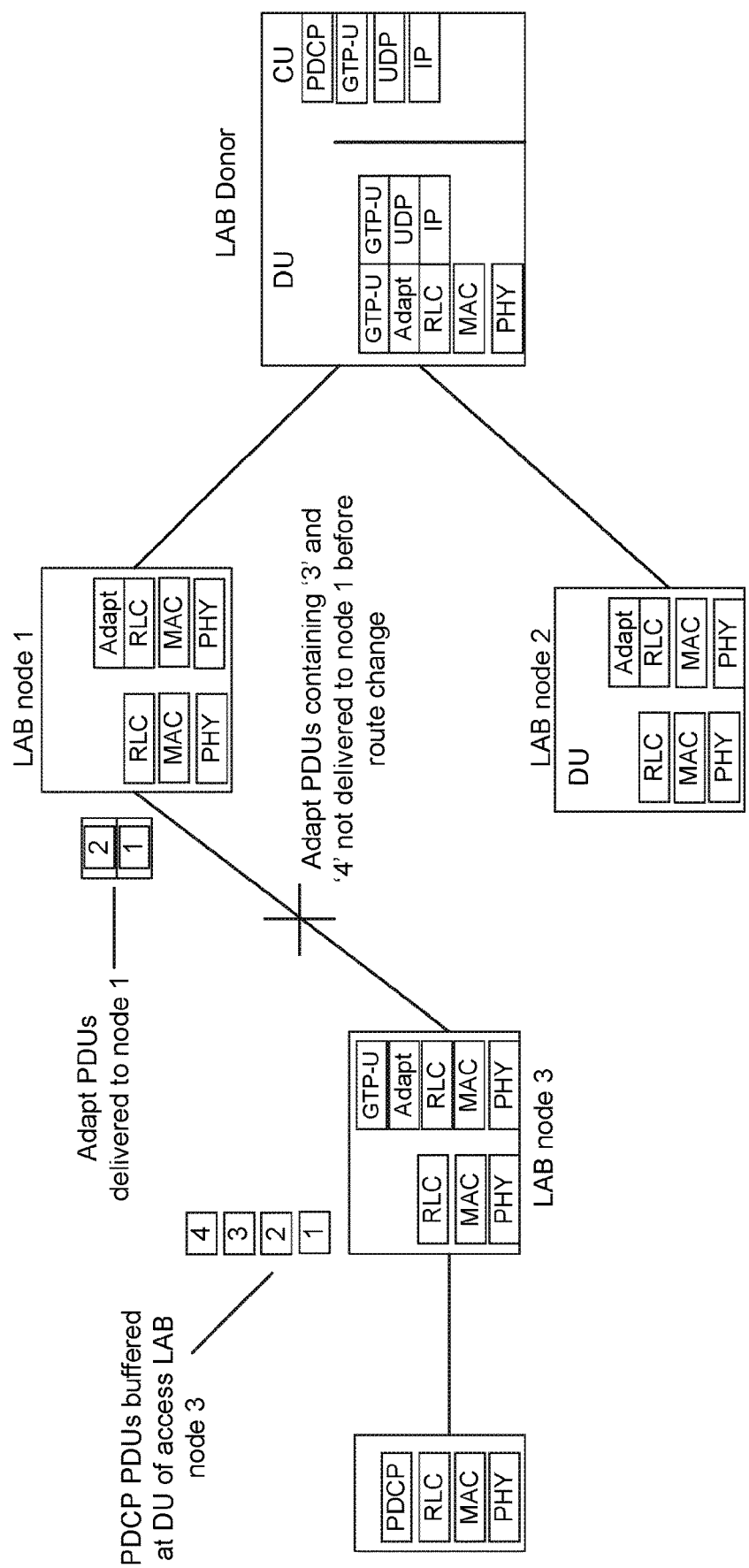
FIG. 4 depicts the proposed uplink retransmission procedure during the backhaul link failure in accordance with some embodiments.
Figure 5:
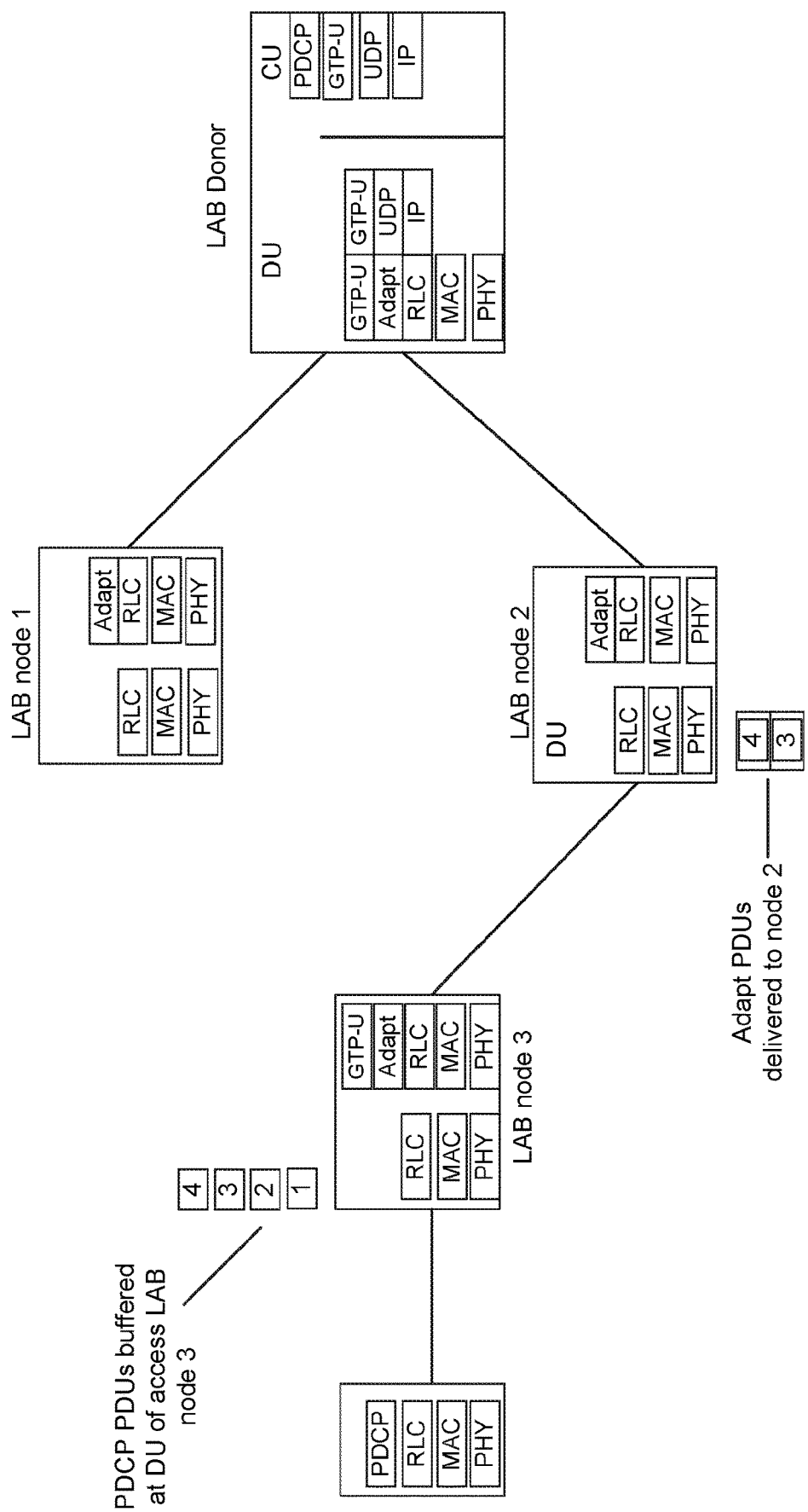
FIG. 5 depicts the proposed uplink retransmission procedure during the backhaul link failure in accordance with some embodiments.

The serving IAB node (DU4) in the above example buffers the UE data PDUs (e.g. PDCP PDUs, RLC PDUs, etc.) received from the UE, even after they are submitted to the adaptation layer in the mobile terminal (MT) in IAB node4 for uplink transmission. Alternatively, the serving IAB node may encapsulate UE data packet (e.g. PDCP PDU) in F1-U (GTP-u) PDU, and buffer the F1-U PDU. The detailed procedure is illustrated in FIGS. 4 and 5 in accordance with some embodiments.

The access IAB node buffers PDCP PDUs received from the UE and also submits them to the MT for transmission. Based on the mapping of the bearer of the UE and routing configuration, the mobile terminal (MT) constructs an adaptation layer PDU which includes at least some of the PDCP PDUs submitted to the MT as payload. The header of the adaptation layer PDU identifies routing information needed to route the PDUs along the selected route. For example, in FIG. 1, IAB node 3 inserts adaptation layer header information to enable routing of the PDUs along the route IAB node 3→IAB node 1→IAB donor.

Upon a change of parent node at IAB node 3 from node 1 to node 2 (due to a handover or a backhaul failure followed by recovery) a route update is performed such that IAB node 3 is served via the route IAB donor-IAB node 2-IAB node 3. The DU of IAB node 3 may then receive an uplink DDS message as described above, indicating PDCP PDUs (e.g. #3, #4) not received by the IAB donor CU.

In response to the uplink DDS message:

The IAB node 3 DU identifies the PDCP PDUs that are buffered.

The identified PDCP PDUs are submitted to the MT again for transmission.

The MT constructs new adaptation layer PDUs (note that due to the route change, the adaptation layer header may need to be different; therefore new adaptation layer PDUs need to be constructed). The adaptation layer PDUs are transmitted to the next hop (to IAB node 2 as shown in FIG. 2.

Notice that the relay node may have limited buffer, and therefore won't keep UE's uplink data forever. Here, we define a new parameter: UL Retransmission Timer, which can be configured by the donor based on the end-to-end transport latency between the serving relay node and the donor node. This parameter indicates the maximum time that the relay node will keep UE's uplink data packet in its buffer. Moreover, the donor node may periodically send out the F1-UDDS PDU message to the serving IAB node. In response, the IAB node can remove UE's uplink data that have already been received by the donor.

Figure 17:
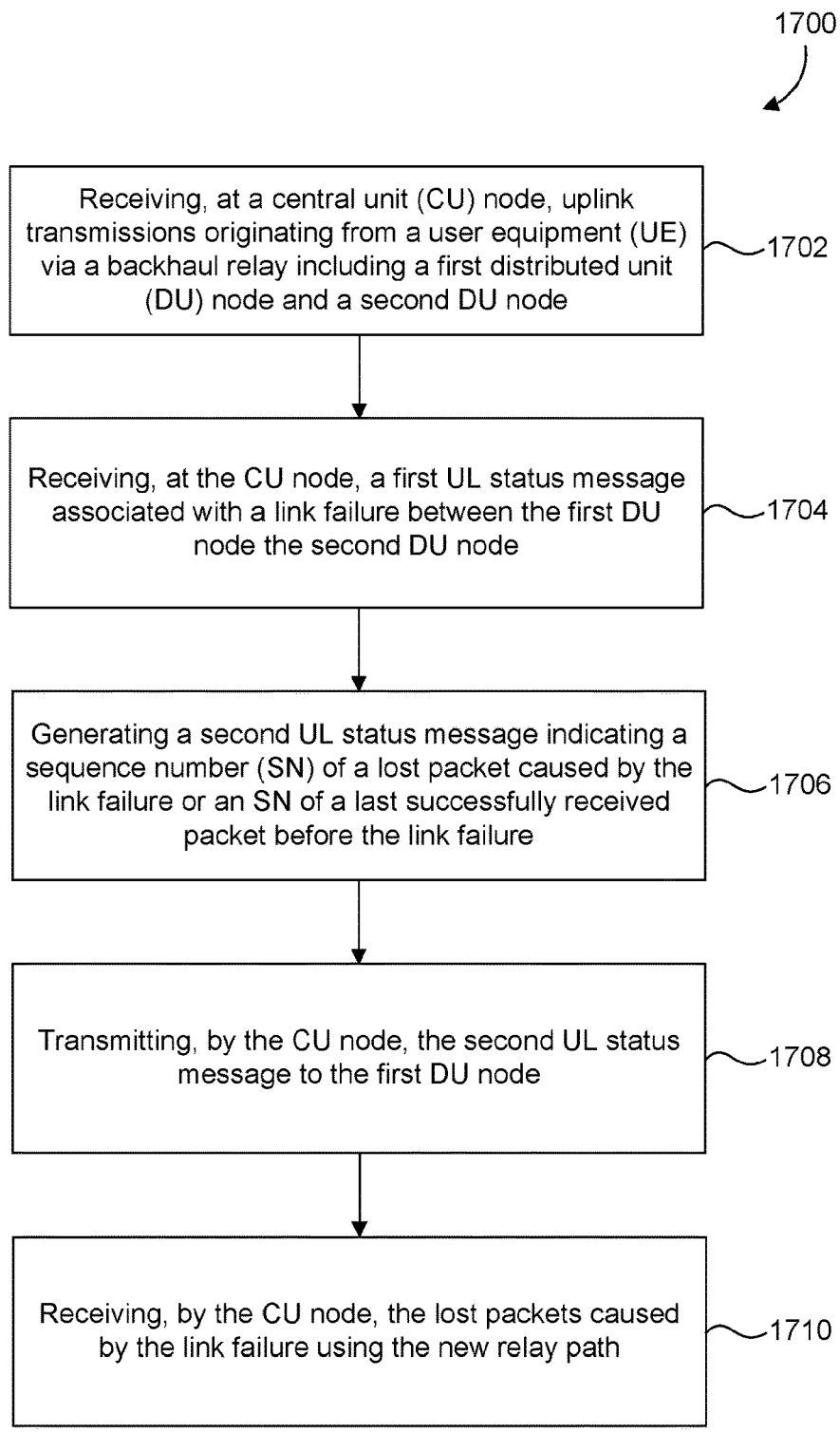
FIG. 17 depicts an example flowchart for practicing the various embodiments discussed herein, for example, for recovering from a link relay failure.

In some embodiments, the electronic device(s), network (s), system(s), chip(s) or component(s), or portions or implementations thereof, of FIGS. 1-14, or some other figure herein, may be configured to perform one or more processes, techniques, or methods as described herein, or portions thereof. One such process is depicted in FIG. 17. FIG. 17 illustrates a flowchart 1700 that describes an electronic device, for example a CU 108 in FIG. 1, or donor CU in FIG. 3 described herein for use in a wireless network for recovering from relay link failure in a multi-hop backhaul relay.

In step 1702, the method receives, at a central unit (CU) node, uplink transmissions originating from a user equipment (UE) via a backhaul relay including a first distributed unit (DU) node and a second DU node. For example, referring to FIG. 3 prior to radio link failure, DU2 and DU3 participate in a multi-relay backhaul to provide uplink packets from a UE to the donor CU 302.

In step 1704, the method receives, at the CU node, a first UL status message associated with a link failure between the first DU node the second DU node. For example, referring to FIG. 3, DU2 and DU3 determine their radio link has failed. After which, DU2 sends an uplink status message (e.g., F1 UDDS message) indicative of the radio link outage and corresponding sequence numbers of lost packets or the last successfully received packet.

In step 1706, the method generates a second UL status message indicating a sequence number (SN) of a lost packet caused by the link failure or an SN of a last successfully received packet before the link failure. For example, referring to FIG. 3, the donor CU 302 generates a status message (e.g., F1 UDDS message) that includes the sequence numbers of the lost packets or the last successfully received packet. The second status message can also include a new relay path, for example, via a different DU.

In step 1708, the method transmits, by the CU node, the second UL status message to the first DU node. For example, referring to FIG. 3, the CU 302 sends the second status message (e.g. F1 UDDS), including the lost packet sequence numbers, to DU3 and requests retransmission, via a new relay path DU1.

In step 1710, the method receives, by the CU node, the lost packets caused by the link failure using the new relay path, e.g., via DU1.

The functions and/or processes of FIG. 17 can be at least partially performed by one or more of application circuitry 905 or 1005, baseband circuitry 910 or 1010, and/or processor(s) 1410.

Systems and Implementations

Figure 6:
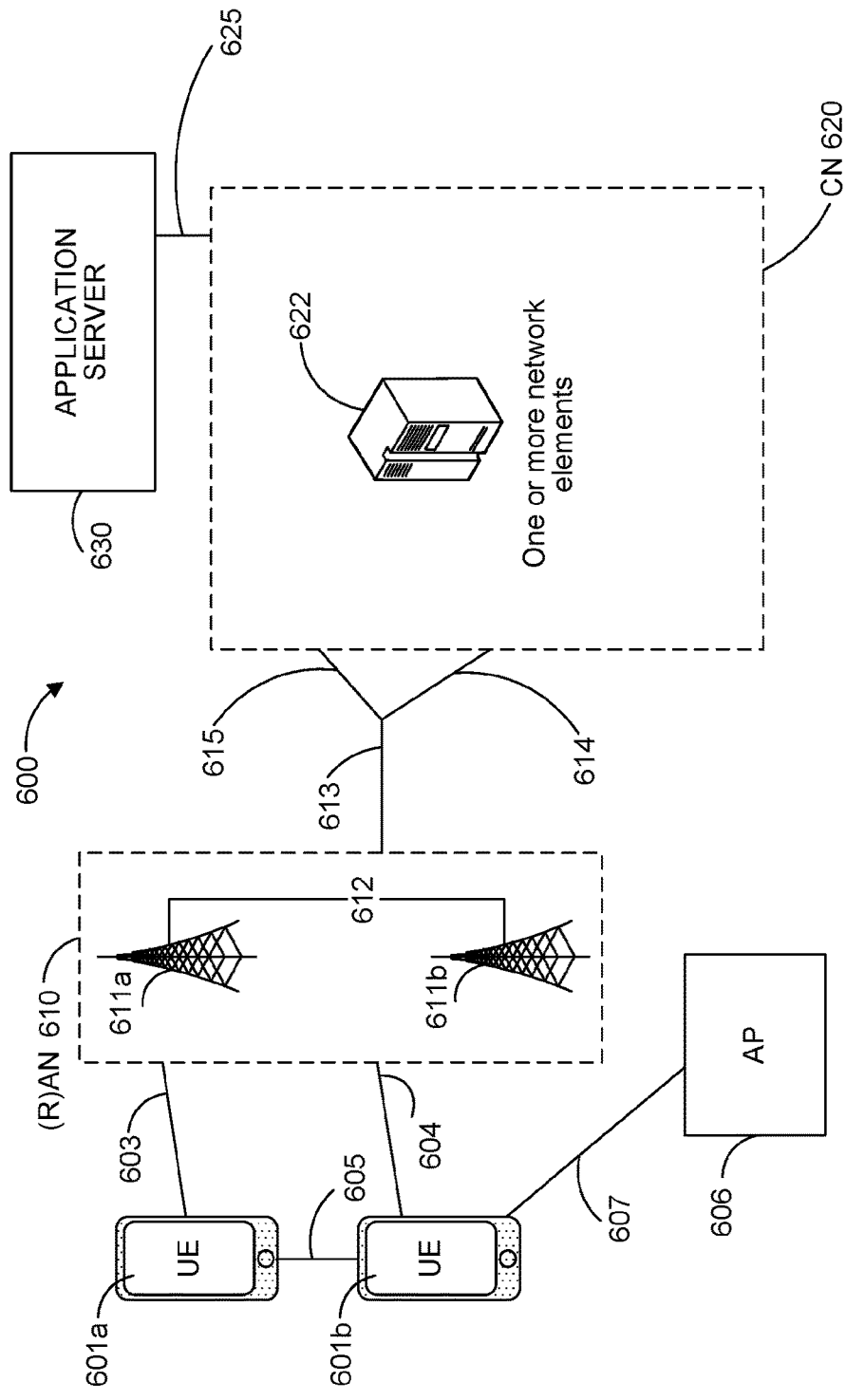
FIG. 6 depicts an architecture of a system of a network, in accordance with some embodiments.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 601a and UE 601b (collectively referred to as "UEs 601" or "UE 601"). In this example, UEs 601 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 601 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 may be configured to connect, for example, communicatively couple, with an or RAN 610. In embodiments, the RAN 610 may be an NG RAN or a 5G RAN, an E-UTRAN, or a legacy RAN, such as a UTRAN or GERAN. As used herein, the term "NG RAN" or the like may refer to a RAN 610 that operates in an NR or 5G system 600, and the term "E-UTRAN" or the like may refer to a RAN 610 that operates in an LTE or 4G system 600. The UEs 601 utilize connections (or channels) 603 and 604, respectively, each of which comprises a physical communications interface or layer (discussed in further detail below).

In this example, the connections 603 and 604 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 601 may directly exchange communication data via a ProSe interface 605. The ProSe interface 605 may alternatively be referred to as a SL interface 605 and may comprise one or more logical channels, including but not limited to a PSCCH, a PSSCH, a PSDCH, and a PSBCH.

The UE 601b is shown to be configured to access an AP 606 (also referred to as "WLAN node 606," "WLAN 606," "WLAN Termination 606," "WT 606" or the like) via connection 607. The connection 607 can comprise a local wireless connection, such as a connection consistent with any IEEE 802.11 protocol, wherein the AP 606 would comprise a wireless fidelity (Wi-Fi®) router. In this example, the AP 606 is shown to he connected to the Internet without connecting to the core network of the wireless system (described in further detail below). In various embodiments, the UE 601b, RAN 610, and AP 606 may be configured to utilize LWA operation and/or LWIP operation. The LWA operation may involve the UE 601b in RRC_CONNECTED being configured by a RAN node 611a-b to utilize radio resources of LTE and WLAN. LWIP operation may involve the UE 601b using WLAN radio resources (e.g., connection 607) via IPsec protocol tunneling to authenticate and encrypt packets (e.g., IP packets) sent over the connection 607. IPsec tunneling may include encapsulating the entirety of original IP packets and adding a new packet header, thereby protecting, the original header of the IP packets.

The RAN 610 can include one or more AN nodes or RAN nodes 611a and 611b (collectively referred to as "RAN nodes 611" or "RAN node 611") that enable the connections 603 and 604. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 611 that operates in an NR or 5G system 600 (for example, a gNB), and the term "E-UTRAN node" or the like may refer to a RAN node 611 that operates in an LTE or 4G system 600 (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 611 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 611; a MAC/PHY split wherein RRC, PDCP, RLC, and MAC layers are operated by the CRAN/vBBUP and the PHY layer is operated by individual RAN nodes 611; or a "lower PHY" split wherein RRC, PDCP, RLC, MAC layers and upper portions of the PHY layer are operated by the CRAN/vBBUP and lower portions of the PHY layer are operated by individual RAN nodes 611. This virtualized framework allows the freed-up processor cores of the RAN nodes 611 to perform other virtualized applications. In some implementations, an individual RAN node 611 may represent individual gNB-DUs that are connected to a gNB-CU via individual F1 interfaces (not shown by FIG. 6). In these implementations, the gNB-DUs may include one or more remote radio heads or RFEMs (see, e.g., FIG. 9), and the gNB-CU may be operated by a server that is located in the RAN 610 (not shown) or by a server pool in a similar manner as the CRAN/vBBUP. Additionally or alternatively, one or more of the RAN nodes 611 may be next generation eNBs (ng-eNBs), which are RAN nodes that provide E-UTRA user plane and control plane protocol terminations toward the UEs 601, and are connected to a 5GC (e.g., CN 820 of FIG. 8) via an NG interface (discussed infra).

In V2X scenarios one or more of the RAN nodes 611 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 601 (vUEs 601). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 611 can terminate the air interface protocol and can be the first point of contact for the UEs 601. In some embodiments, any of the RAN nodes 611 can fulfill various logical functions for the RAN 610 including, but not limited to, radio network controller (RNC) functions such as radio bearer management, uplink and downlink dynamic radio resource management and data packet scheduling, and mobility management.

In embodiments, the UEs 601 can be configured to communicate using OFDM communication signals with each other or with any of the RAN nodes 611 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 to the UEs 601, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 601 and the RAN nodes 611 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 601 and the RAN nodes 611 may operate using LAA, eLAA, and/or feLAA mechanisms. In these implementations, the UEs 601 and the RAN nodes 611 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 601 RAN nodes 611, etc.) senses a medium (for example, a channel or carrier frequency) and transmits when the medium is sensed to be idle (or when a specific channel in the medium is sensed to he unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 601, AP 606, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 601 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 601. The PDCCH carries information about the transport format and resource allocations related to the PDSCH channel, among other things. It may also inform the UEs 601 about the transport format, resource allocation, and HARQ information related to the uplink shared channel. Typically, downlink scheduling (assigning control and shared channel resource blocks to the UE 601b within a cell) may be performed at any of the RAN nodes 611 based on channel quality information fed back from any of the UEs 601. The downlink resource assignment information may be sent on the PDCCH used for (e.g., assigned to) each of the UEs 601.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 611 may be configured to communicate with one another via interface 612. In embodiments where the system 600 is an LTE system (e.g., when CN 620 is an EPC 720 as in FIG. 7), the interface 612 may be an X2 interface 612. The X2 interface may be defined between two or more RAN nodes 611 (e.g., two or more eNBs and the like) that connect to EPC 620, and/or between two eNBs connecting to EPC 620. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 601 from an SeNB for user data; information of PDCP PDUs that were not delivered to a UE 601; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 600 is a 5G or NR system (e.g., when CN 620 is an 5GC 820 as in FIG. 8), the interface 612 may be an Xn interface 612. The Xn interface is defined between two or more RAN nodes 611 (e.g., two or more gNBs and the like) that connect to 5GC 620, between a RAN node 611 (e.g., a gNB) connecting to 5GC 620 and an eNB, and/or between two eNBs connecting to 5GC 620. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 610 is shown to be communicatively coupled to a core network—in this embodiment, core network (CN) 620. The CN 620 may comprise a plurality of network elements 622, which are configured to offer various data and telecommunications services to customers/subscribers (e.g., users of UEs 601) who are connected to the CN 620 via the RAN 610. The components of the CN 620 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 620 may be referred to as a network slice, and a logical instantiation of a portion of the CN 620 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 630 may be an element offering applications that use IP bearer resources with the core network (e.g., UMTS PS domain, LTE PS data services, etc.). The application server 630 can also be configured to support one or more communication services (e.g., VoIP sessions, PTT sessions, group communication sessions, social networking services, etc.) for the UEs 601 via the EPC 620.

In embodiments, the CN 620 may be a 5GC (referred to as "5GC 620" or the like), and the RAN 610 may be connected with the CN 620 via an NG interface 613. In embodiments, the NG interface 613 may be split into two parts, an NG user plane (NG-U) interface 614, which carries traffic data between the RAN nodes 611 and a UPF, and the S1 control plane (NG-C) interface 615, which is a signaling interface between the RAN nodes 611 and AMFs. Embodiments where the CN 620 is a 5GC 620 are discussed in more detail with regard to FIG. 8.

In embodiments, the CN 620 may be a 5G CN (referred to as "5GC 620" or the like), while in other embodiments, the CN 620 may be an EPC). Where CN 620 is an EPC (referred to as "EPC 620" or the like), the RAN 610 may be connected with the CN 620 via an S1 interface 613. In embodiments, the S1 interface 613 may be split into two parts, an S1 user plane (S1-U) interface 614, which carries traffic data between the RAN nodes 611 and the S-GW, and the S1-MME interface 615, which is a signaling interface between the RAN nodes 611 and MMEs.

Figure 7:
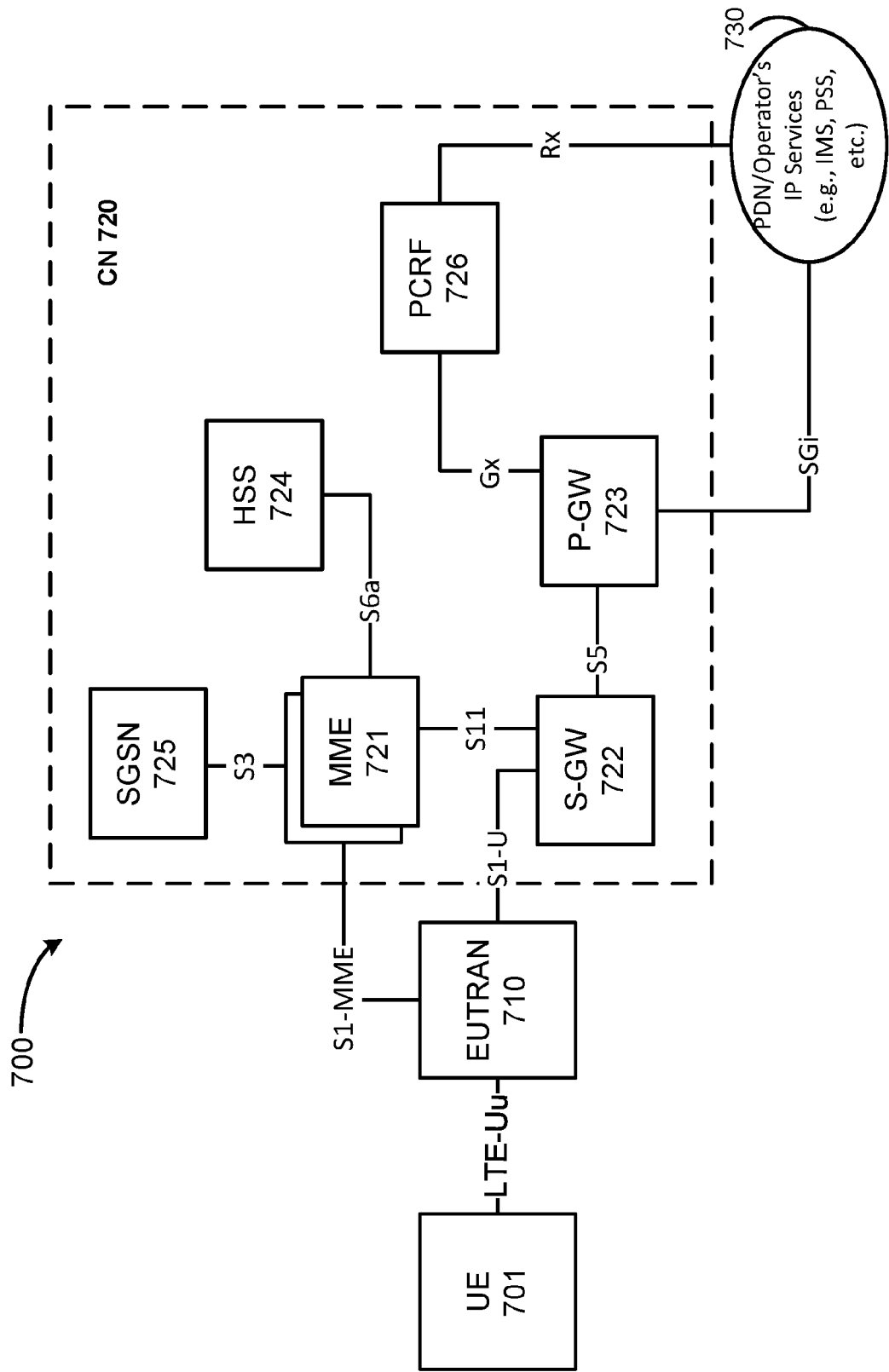
FIG. 7 depicts an architecture of a system including a first core network, in accordance with some embodiments.

FIG. 7 illustrates an example architecture of a system 700 including a first CN 720, in accordance with various embodiments. In this example, system 700 may implement the LTE standard wherein the CN 720 is an EPC 720 that corresponds with CN 620 of FIG. 6. Additionally, the UE 701 may be the same or similar as the UEs 601 of FIG. 6, and the E-UTRAN 710 may be a RAN that is the same or similar to the RAN 610 of FIG. 6, and which may include RAN nodes 611 discussed previously. The CN 720 may comprise MMEs 721, an S-GW 722, a P-GW 723, a HSS 724, and a SGSN 725.

The MMEs 721 may be similar in function to the control plane of legacy SGSN, and may implement MM functions to keep track of the current location of a UE 701. The MMEs 721 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 701, provide user identity confidentiality, and/or perform other like services to users/subscribers. Each UE 701 and the MME 721 may include an MM or EMM sublayer, and an MM context may be established in the UE 701 and the MME 721 when an attach procedure is successfully completed. The MM context may be a data structure or database object that stores MM-related information of the UE 701. The MMEs 721 may be coupled with the HSS 724 via an S6a reference point, coupled with the SGSN 725 via an S3 reference point, and coupled with the S-GW 722 via an S11 reference point.

The SGSN 725 may be a node that serves the UE 701 by tracking the location of an individual UE 701 and performing security functions. In addition, the SGSN 725 may perform Inter-EPC node signaling for mobility between 2G/3G and E-UTRAN 3GPP access networks; PDN and S-GW selection as specified by the MMEs 721; handling of UE 701 time zone functions as specified by the MMEs 721; and MME selection for handovers to E-UTRAN 3GPP access network. The S3 reference point between the MMEs 721 and the SGSN 725 may enable user and bearer information exchange for inter-3GPP access network mobility in idle and/or active states.

The HSS 724 may comprise a database for network users, including subscription-related information to support the network entities' handling of communication sessions. The EPC 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc. An S6a reference point between the HSS 724 and the MMEs 721 may enable transfer of subscription and authentication data for authenticating/authorizing user access to the EPC 720 between HSS 724 and the MMEs 721.

The S-GW 722 may terminate the Si interface 613 ("S1-U" in FIG. 7) toward the RAN 710, and routes data packets between the RAN 710 and the EPC 720. In addition, the S-GW 722 may be a local mobility anchor point for inter-RAN node handovers and also may provide an anchor for inter-3GPP mobility. Other responsibilities may include lawful intercept, charging, and some policy enforcement. The S11 reference point between the S-GW 722 and the MMEs 721 may provide a control plane between the MMEs 721 and the S-GW 722. The S-GW 722 may be coupled with the P-GW 723 via an S5 reference point.

The P-GW 723 may terminate an SGi interface toward a PDN 730. The P-GW 723 may route data packets between the EPC 720 and external networks such as a network including the application server 630 (alternatively referred to as an "AF") via an IP interface 625 (see e.g., FIG. 6). In embodiments, the P-GW 723 may be communicatively coupled to an application server (application server 630 of FIG. 6 or PDN 730 in FIG. 7) via an IP communications interface 625 (see, e.g., FIG. 6). The S5 reference point between the P-GW 723 and the S-GW 722 may provide user plane tunneling and tunnel management between the P-GW 723 and the S-GW 722. The S5 reference point may also be used for S-GW 722 relocation due to UE 701 mobility and if the S-GW 722 needs to connect to a non-collocated P-GW 723 for the required PDN connectivity. The P-GW 723 may further include a node for policy enforcement and charging data collection (e.g., PCEF (not shown)). Additionally, the SGi reference point between the P-GW 723 and the packet data network (PDN) 730 may be an operator external public, a private PDN, or an intra operator packet data network, for example, for provision of IMS services. The P-GW 723 may be coupled with a PCRF 726 via a Gx reference point.

PCRF 726 is the policy and charging control element of the EPC 720. In a non-roaming scenario, there may be a single PCRF 726 in the Home Public Land Mobile Network (HPLMN) associated with a UE 701's Internet Protocol Connectivity Access Network (IP-CAN) session. In a roaming scenario with local breakout of traffic, there may be two PCRFs associated with a UE 701's IP-CAN session, a Home PCRF (H-PCRF) within an HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate QoS and charging parameters. The PCRF 726 may provision this rule into a PCEF (not shown) with the appropriate TFT and QCI, which commences the QoS and charging as specified by the application server 730. The Gx reference point between the PCRF 726 and the P-GW 723 may allow for the transfer of QoS policy and charging rules from the PCRF 726 to PCEF in the P-GW 723. An Rx reference point may reside between the PDN 730 (or "AF 730") and the PCRF 726.

Figure 8:
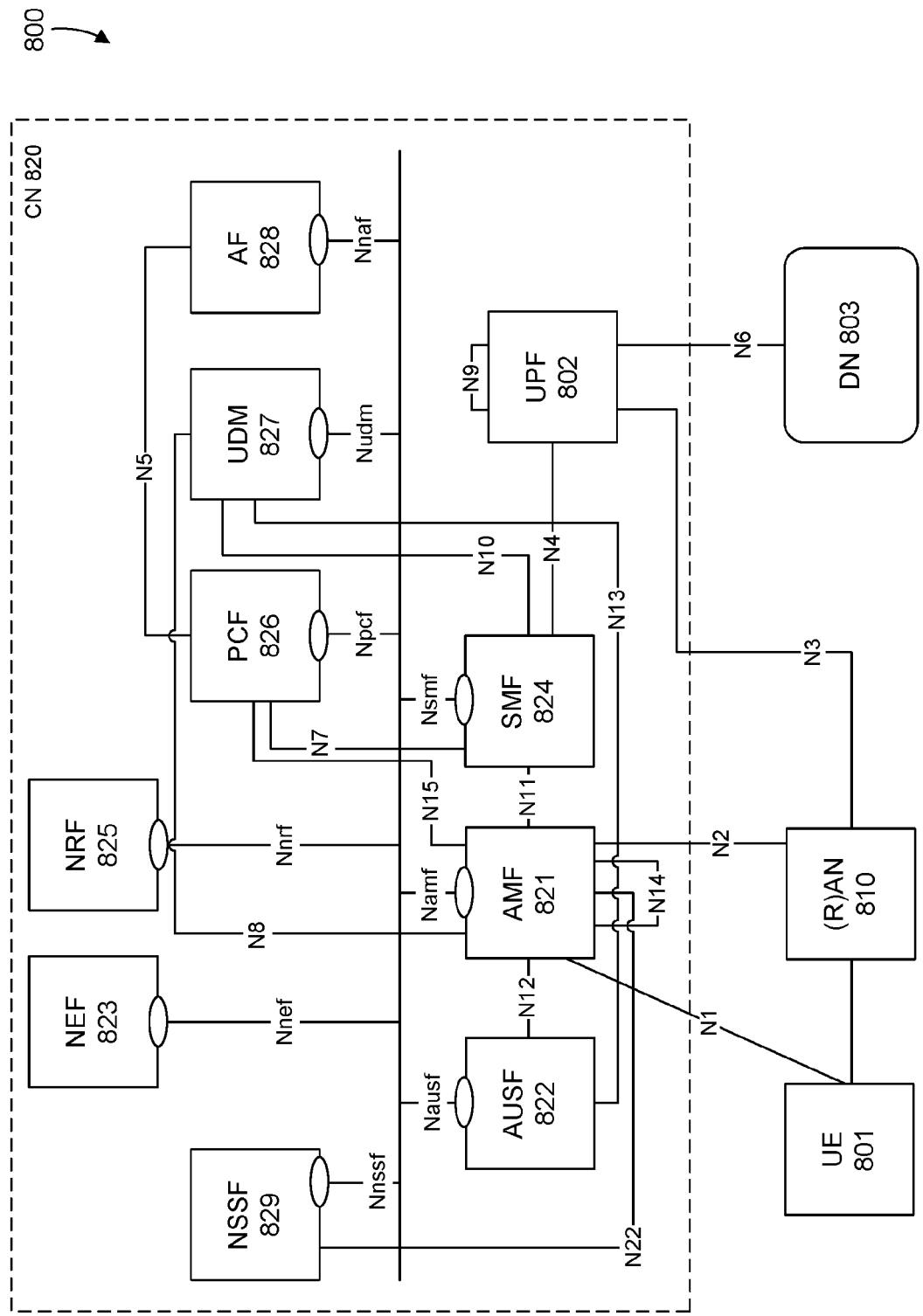
FIG. 8 depicts an architecture of a system including a second core network in accordance with some embodiments.

FIG. 8 illustrates an architecture of a system 800 including a second CN 820 in accordance with various embodiments. The system 800 is shown to include a UE 801, which may be the same or similar to the UEs 601 and UE 701 discussed previously; a (R)AN 810, which may be the same or similar to the RAN 610 and RAN 710 discussed previously, and which may include RAN nodes 611 discussed previously; and a DN 803, which may be, for example, operator services, Internet access or 3rd party services; and a 5GC 820. The 5GC 820 may include an AUSF 822; an AMF 821; a SMF 824; a NEF 823; a PCF 826; a NRF 825; a UDM 827; an AF 828; a UPF 802; and a NSSF 829.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 802 may include an uplink classifier to support routing traffic flows to a data network. The DN 803 may represent various network operator services, Internet access, or third party services. DN 803 may include, or be similar to, application server 630 discussed previously. The UPF 802 may interact with the SMF 824 via an N4 reference point between the SMF 824 and the UPF 802.

The AUSF 822 may store data for authentication of UE 801 and handle authentication-related functionality. The AUSF 822 may facilitate a common authentication framework for various access types. The AUSF 822 may communicate with the AMF 821 via an N12 reference point between the AMF 821 and the AUSF 822; and may communicate with the UDM 827 via an N13 reference point between the UDM 827 and the AUSF 822. Additionally, the AUSF 822 may exhibit an Nausf service-based interface.

The AMF 821 may be responsible for registration management (e.g., for registering UE 801, etc.), connection management, reachability management, mobility management, and lawful interception of AMF-related events, and access authentication and authorization. The AMF 821 may be a termination point for the an N11 reference point between the AMF 821 and the SMF 824. The AMF 821 may provide transport for SM messages between the UE 801 and the SMF 824, and act as a transparent proxy for routing SM messages. AMF 821 may also provide transport for SMS messages between UE 801 and an SMSF (not shown by FIG. 8). AMF 821 may act as SEAF, which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a SCM function, which receives a key from the SEA that it uses to derive access-network specific keys. Furthermore, AMF 821 may be a termination point of a RAN CP interface, which may include or be an N2 reference point between the (R)AN 810 and the AMF 821; and the AMF 821 may be a termination point of NAS (N1) signaling, and perform NAS ciphering and integrity protection.

AMF 821 may also support NAS signaling with a UE 801 over an N3 IWF interface. The N3IWF may be used to provide access to untrusted entities. N3IWF may be a termination point for the N2 interface between the (R)AN 810 and the AMF 821 for the control plane, and may be a termination point for the N3 reference point between the (R)AN 810 and the UPF 802 for the user plane. As such, the AMF 821 may handle N2 signaling from the SMF 824 and the AMF 821 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 801 and AMF 821 via an N1 reference point between the UE 801 and the AMF 821, and relay uplink and downlink user-plane packets between the UE 801 and UPF 802. The N3IWF also provides mechanisms for IPsec tunnel establishment with the UE 801. The AMF 821 may exhibit an Namf service-based interface, and may be a termination point for an N14 reference point between two AMFs 821 and an N17 reference point between the AMF 821 and a 5G-EIR (not shown by FIG. 8).

The UE 801 may need to register with the AMF 821 in order to receive network services. RM is used to register or deregister the UE 801 with the network (e.g., AMF 821), and establish a UE context in the network (e.g., AMF 821). The UE 801 may operate in an RM-REGISTERED state or an RM-DEREGISTERED state. In the RM DEREGISTERED state, the UE 801 is not registered with the network, and the UE context in AMF 821 holds no valid location or routing information for the UE 801 so the UE 801 is not reachable by the AMF 821. In the RM REGISTERED state, the UE 801 is registered with the network, and the UE context in AMF 821 may hold a valid location or routing information for the UE 801 so the UE 801 is reachable by the AMF 821. In the RM-REGISTERED state, the UE 801 may perform mobility Registration Update procedures, perform periodic Registration Update procedures triggered by expiration of the periodic update timer (e.g., to notify the network that the UE 801 is still active), and perform a Registration Update procedure to update UE capability information or to re-negotiate protocol parameters with the network, among others.

The AMF 821 may store one or more RM contexts for the UE 801, where each RM context is associated with a specific access to the network. The RM context may be a data structure, database object, etc. that indicates or stores, inter alia, a registration state per access type and the periodic update timer. The AMF 821 may also store a 5GC MM context that may be the same or similar to the (E)MM context discussed previously. In various embodiments, the AMF 821 may store a CE mode B Restriction parameter of the UE 801 in an associated MM context or RM context. The AMF 821 may also derive the value, when needed, from the UE's usage setting parameter already stored in the UE context (and/or MM/RM context).

CM may be used to establish and release a signaling connection between the UE 801 and the AMF 821 over the N1 interface. The signaling connection is used to enable NAS signaling exchange between the UE 801 and the CN 820, and comprises both the signaling connection between the UE and the AN (e.g., RRC connection or UE-N3IWF connection for non-3GPP access) and the N2 connection for the UE 801 between the AN (e.g., RAN 810) and the AMF 821. The UE 801 may operate in one of two CM states, CM-IDLE mode or CM-CONNECTED mode. When the UE 801 is operating in the CM-IDLE state/mode, the UE 801 may have no NAS signaling connection established with the AMF 821 over the N1 interface, and there may be (R)AN 810 signaling connection (e.g., N2 and/or N3 connections) for the UE 801. When the UE 801 is operating in the CM-CONNECTED state/mode, the UE 801 may have an established NAS signaling connection with the AMF 821 over the N1 interface, and there may be a (R)AN 810 signaling connection (e.g., N2 and/or N3 connections) for the UE 801. Establishment of an N2 connection between the (R)AN 810 and the AMF 821 may cause the UE 801 to transition from CM-IDLE mode to CM-CONNECTED mode, and the UE 801 may transition from the CM-CONNECTED mode to the CM-IDLE mode when N2 signaling between the (R)AN 810 and the AMF 821 is released.

The SMF 824 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 801 and a data network (DN) 803 identified by a Data Network Name (DNN). PDU sessions may be established upon UE 801 request, modified upon UE 801 and 5GC 820 request, and released upon UE 801 and 5GC 820 request using NAS SM signaling exchanged over the N1 reference point between the UE 801 and the SMF 824. Upon request from an application server, the 5GC 820 may trigger a specific application in the UE 801. In response to receipt of the trigger message, the UE 801 may pass the trigger message (or relevant parts/information of the trigger message) to one or more identified applications in the UE 801. The identified application(s) in the UE 801 may establish a PDU session to a specific DNN. The SMF 824 may check whether the UE 801 requests are compliant with user subscription information associated with the UE 801. In this regard, the SMF 824 may retrieve and/or request to receive update notifications on SMF 824 level subscription data from the UDM 827.

The SMF 824 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 824 may be included in the system 800, which may be between another SMF 824 in a visited network and the SMF 824 in the home network in roaming scenarios. Additionally, the SMF 824 may exhibit the Nsmf service-based interface.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using standardized interfaces. The stored information can then be re-exposed by the NEF 823 to other NFs and AFs, and/or used for other purposes such as analytics. Additionally, the NEF 823 may exhibit an Nnef service-based interface.

The NRF 825 may support service discovery functions, receive NF discovery requests from NF instances, and provide the information of the discovered NF instances to the NF instances. NRF 825 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 825 may exhibit the Nnrf service-based interface.

The PCF 826 may provide policy rules to control plane function(s) to enforce them, and may also support unified policy framework to govern network behaviour. The PCF 826 may also implement an FE to access subscription information relevant for policy decisions in a UDR of the UDM 827. The PCF 826 may communicate with the AMF 821 via an N15 reference point between the PCF 826 and the AMF 821, which may include a PCF 826 in a visited network and the AMF 821 in case of roaming scenarios. The PCF 826 may communicate with the AF 828 via an N5 reference point between the PCF 826 and the AF 828; and with the SMF 824 via an N7 reference point between the PCF 826 and the SMF 824. The system 800 and/or CN 820 may also include an N24 reference point between the PCF 826 (in the home network) and a PCF 826 in a visited network. Additionally, the PCF 826 may exhibit an Npcf service-based interface.

The UDM 827 may handle subscription-related information to support the network entities' handling of communication sessions, and may store subscription data of UE 801. For example, subscription data may be communicated between the UDM 827 and the AMF 821 via an N8 reference point between the UDM 827 and the AMF. The UDM 827 may include two parts, an application FE and a UDR (the FE and UDR are not shown by FIG. 8). The UDR may store subscription data and policy data for the UDM 827 and the PCF 826, and/or structured data for exposure and application data (including PFDs for application detection, application request information for multiple UEs 801) for the NEF 823. The Nudr service-based interface may be exhibited by the UDR 221 to allow the UDM 827, PCF 826, and NEF 823 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 824 via an N10 reference point between the UDM 827 and the SMF 824. UDM 827 may also support SMS management, wherein an SMS-FE implements the similar application logic as discussed previously. Additionally, the UDM 827 may exhibit the Nudm service-based interface.

The AF 828 may provide application influence on traffic routing, provide access to the NCE, and interact with the policy framework for policy control. The NCE may be a mechanism that allows the 5GC 820 and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface. This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs. Additionally, the AF 828 may exhibit an Naf service-based interface.

The NSSF 829 may select a set of network slice instances serving the UE 801. The NSSF 829 may also determine allowed NSSAI and the mapping to the subscribed S-NS-SAIs, if needed. The NSSF 829 may also determine the AMF set to be used to serve the UE 801, or a list of candidate AMF(s) 821 based on a suitable configuration and possibly by querying the NRF 825. The selection of a set of network slice instances for the UE 801 may be triggered by the AMF 821 with which the UE 801 is registered by interacting with the NSSF 829, which may lead to a change of AMF 821. The NSSF 829 may interact with the AMF 821 via an N22 reference point between AMF 821 and NSSF 829; and may communicate with another NSSF 829 in a visited network via an N31 reference point (not shown by FIG. 8). Additionally, the NSSF 829 may exhibit an Nnssf service-based interface.

As discussed previously, the CN 820 may include an SMSF, which may be responsible for SMS subscription checking and verification, and relaying SM messages to/from the UE 801 to/front other entities, such as an SMS-GMSC/IWMSC/SMS-router. The SMS may also interact with AMF 821 and UDM 827 for a notification procedure that the UE 801 is available for SMS transfer (e.g., set a UE not reachable flag, and notifying UDM 827 when UE 801 is available for SMS).

The CN 120 may also include other elements that are not shown by FIG. 8, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 8). Individual NFs may share a UDSF for storing their respective unstructured data or individual NFs may each have their own UDSF located at or near the individual NFs. Additionally, the UDSF may exhibit an Nudsf service-based interface (not shown by FIG. 8). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 8 for clarity. In one example, the CN 820 may include an Nx interface, which is an inter-CN interface between the MME (e.g., MME 721) and the AMF 821 in order to enable interworking between CN 820 and CN 720. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 9:
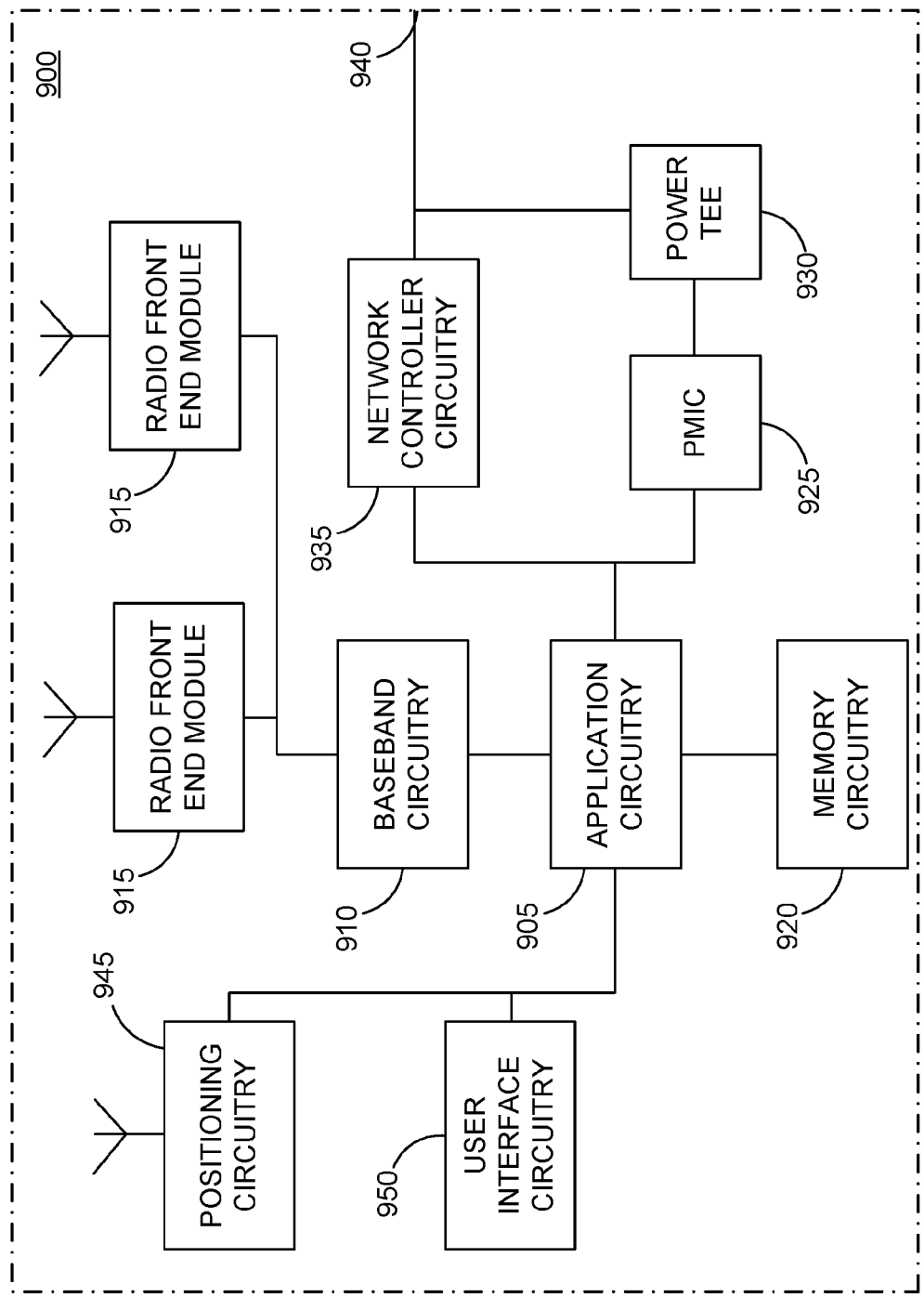
FIG. 9 depicts an example of infrastructure equipment, in accordance with various embodiments.

FIG. 9 illustrates an example of infrastructure equipment 900 in accordance with various embodiments. The infrastructure equipment 900 (or "system 900") may be implemented as a base station, radio head, RAN node such as the RAN nodes 611 and/or AP 606 shown and described previously, application server(s) 630, and/or any other element/device discussed herein. In other examples, the system 900 could be implemented in or by a UE.

The system 900 includes application circuitry 905, baseband circuitry 910, one or more radio front end modules (RFEMs) 915, memory circuitry 920, power management integrated circuitry (PMC) 925, power tee circuitry 930, network controller circuitry 935, network interface connector 940, satellite positioning circuitry 945, and user interface circuitry 950. In some embodiments, the device 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 905 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 905 may comprise, or may be, a special-purpose processor/controller to operate according to the various embodiments herein. As examples, the processor(s) of application circuitry 905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 900 may not utilize application circuitry 905, and instead may include a special-purpose processor/controller to process IP data received from an EPC or 5GC, for example.

In some implementations, the application circuitry 905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 910 are discussed infra with regard to FIG. 11.

User interface circuitry 950 may include one or more user interfaces designed to enable user interaction with the system 900 or peripheral component interfaces designed to enable peripheral component interaction with the system 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1111 of FIG. 11 infra), and the RFEM may be connected to multiple antennas. In alternative implementations, both mmWave and sub-mmWave radio functions may be implemented in the same physical RFEM 915, which incorporates both mmWave antennas and sub-mmWave.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 may provide for electrical power drawn from a network cable to provide both power supply and data connectivity to the infrastructure equipment 900 using a single cable.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the baseband circuitry 910 and/or RFEMs 915 to communicate with the nodes and components of the positioning network. The positioning circuitry 945 may also provide position data and/or time data to the application circuitry 905, which may use the data to synchronize operations with various infrastructure (e.g., RAN nodes 611, etc.), or the like.

The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system.

Other bus/IX systems may be included, such as an I²C interface, an SPI interface, point to point interfaces, and a power bus, among others.

Figure 10:
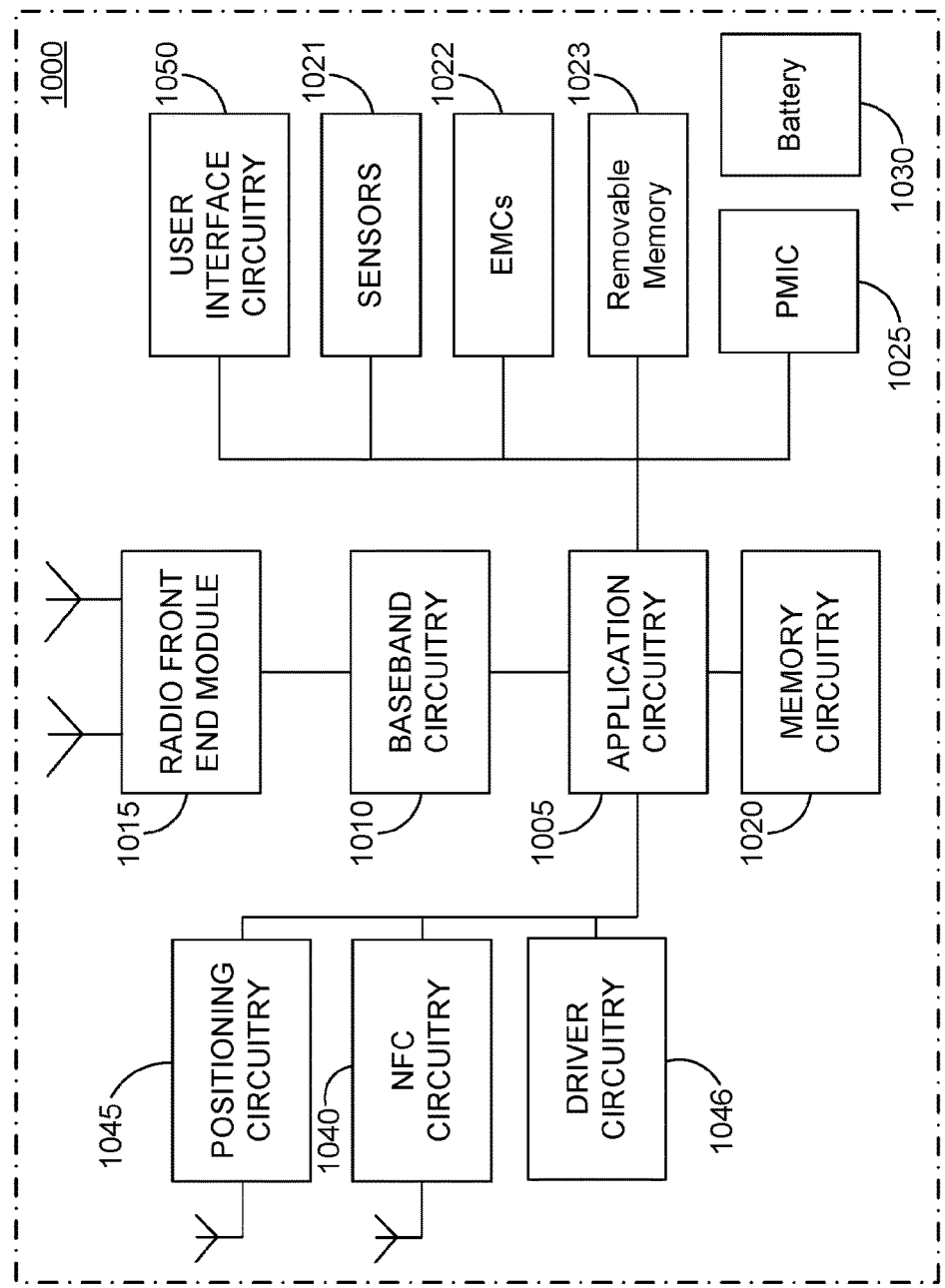
FIG. 10 depicts example components of a computer platform, in accordance with various embodiments.

FIG. 10 illustrates an example of a platform 1000 (or "device 1000") in accordance with various embodiments. In embodiments, the computer platform 1000 may be suitable for use as UEs 601, 701, 801, application servers 630, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1005 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 905 may comprise, or may be, a special-purpose processor/controller to operate according to the various embodiments herein.

As examples, the processor(s) of application circuitry 1005 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1005 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1005 may be a part of a system on a chip (SoC) in which the application circuitry 1005 and other components are formed into a single integrated circuit, or a single package, such as the Edison™ or Galileo™ SoC boards from Intel® Corporation.

Additionally or alternatively, application circuitry 1005 may include circuitry such as, but not limited to, one or more a field-programmable devices (PPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1010 may be implemented, for example, as a solder-down substrate including one or more integrated circuits, a single packaged integrated circuit soldered to a main circuit hoard or a multi-chip module containing two or more integrated circuits. The various hardware electronic elements of baseband circuitry 1010 are discussed infra with regard to FIG. 11.

The RFEMs 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g. antenna array 1111 of FIG. 11 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include any number and type of memory devices used to provide for a given amount of system memory. As examples, the memory circuitry 1020 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1020 may be developed in accordance with a Joint Electron Devices Engineering Council (JEDEC) low power double data rate (LPDDR)-based design, such as LPDDR2, LPDDR3, LPDDR4, or the like. Memory circuitry 1020 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1020 may be on-die memory or registers associated with the application circuitry 1005. To provide for persistent storage of information such as data, applications, operating systems and so forth, memory circuitry 1020 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1000 may incorporate the three-dimensional (3D) cross-point (XPOINT) memories from Intel® and Micron®.

Removable memory circuitry 1023 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensor circuitry 1021 and electro-mechanical components (EMCs) 1022, as well as removable memory devices coupled to removable memory circuitry 1023.

The sensor circuitry 1021 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1022 include devices, modules, or subsystems whose purpose is to enable platform 1000 to change its state, position, and/or orientation, or move or control a mechanism or (sub)system. Additionally, EMCs 1022 may be configured to generate and send messages/signaling to other components of the platform 1000 to indicate a current state of the EMCs 1022. Examples of the EMCs 1022 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1022 based on one or more captured events and/or instructions or control signals received from a service provider and/or various clients.

In some implementations, the interface circuitry may connect the platform 1000 with positioning circuitry 1045. The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-PNT IC that uses a master timing clock to perform position tracking/estimation without GNSS assistance. The positioning circuitry 1045 may also be part of, or interact with, the baseband circuitry 910 and/or RFEMs 1015 to communicate with the nodes and components of the positioning network. The positioning circuitry 1045 may also provide position data and/or time data to the application circuitry 1005, which may use the data to synchronize operations with various infrastructure (e.g., radio base stations), for turn-by-turn navigation applications, or the like.

In some implementations, the interface circuitry may connect the platform 1000 with Near-Field Communication (NFC) circuitry 1040. NFC circuitry 1040 is configured to provide contactless, short-range communications based on radio frequency identification (RFID) standards, wherein magnetic field induction is used to enable communication between NFC circuitry 1040 and NFC-enabled devices external to the platform 1000 (e.g., an "NFC touchpoint"). NFC circuitry 1040 comprises an NFC controller coupled with an antenna element and a processor coupled with the NFC controller. The NFC controller may be a chip/IC providing NFC functionalities to the NFC circuitry 1040 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1040, or initiate data transfer between the NFC circuitry 1040 and another active NFC device (e.g., a smartphone or an NFC-enabled POS terminal) that is proximate to the platform 1000.

The driver circuitry 1046 may include software and hardware elements that operate to control particular devices that are embedded in the platform 1000, attached to the platform 1000, or otherwise communicatively coupled with the platform 1000. The driver circuitry 1046 may include individual drivers allowing other components of the platform 1000 to interact with or control various input/output (I/O) devices that may be present within, or connected to, the platform 1000. For example, driver circuitry 1046 may include a display driver to control and allow access to a display device, a touchscreen driver to control and allow access to a touchscreen interface of the platform 1000, sensor drivers to obtain sensor readings of sensor circuitry 1021 and control and allow access to sensor circuitry 1021, EMC drivers to obtain actuator positions of the EMCs 1022 and/or control and allow access to the EMCs 1022, a camera driver to control and allow access to an embedded image capture device, audio drivers to control and allow access to one or more audio devices.

The power management integrated circuitry (PMIC) 1025 (also referred to as "power management circuitry 1025") may manage power provided to various components of the platform 1000. In particular, with respect to the baseband circuitry 1010, the PMIC 1025 may control power-source selection, voltage scaling, battery charging, or DC-to-DC conversion. The PMIC 1025 may often be included when the platform 1000 is capable of being powered by a battery 1030, for example, when the device is included in a UE 601, 701, 801.

In some embodiments, the PMIC 1025 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1030 may power the platform 1000, although in some examples the platform 1000 may be mounted deployed in a fixed location, and may have a power supply coupled to an electrical grid. The battery 1030 may be a lithium ion battery, a metal-air battery, such as a zinc-air battery, an aluminum-air battery, a lithium-air battery, and the like. In some implementations, such as in V2X applications, the battery 1030 may be a typical lead-acid automotive battery.

In some implementations, the battery 1030 may be a "smart battery," which includes or is coupled with a Battery Management System (BMS) or battery monitoring integrated circuitry. The BMS may be included in the platform 1000 to track the state of charge (SoCh) of the battery 1030. The BMS may be used to monitor other parameters of the battery 1030 to provide failure predictions, such as the state of health (SoH) and the state of function (SoF) of the battery 1030. The BMS may communicate the information of the battery 1030 to the application circuitry 1005 or other components of the platform 1000. The BMS may also include an analog-to-digital (ADC) convertor that allows the application circuitry 1005 to directly monitor the voltage of the battery 1030 or the current flow from the battery 1030. The battery parameters may be used to determine actions that the platform 1000 may perform, such as transmission frequency, network operation, sensing frequency, and the like.

A power block, or other power supply coupled to an electrical grid may be coupled with the BMS to charge the battery 1030. In some examples, the power block XS30 may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1030, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1050 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1050 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensor circuitry 1021 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may he a proprietary bus/IX, for example, used in a SoC based system. Other bus/IX systems may be included, such as an I$^2$C interface, an SPI interface, point-to-point interfaces, and a power bus, among others.

Figure 11:
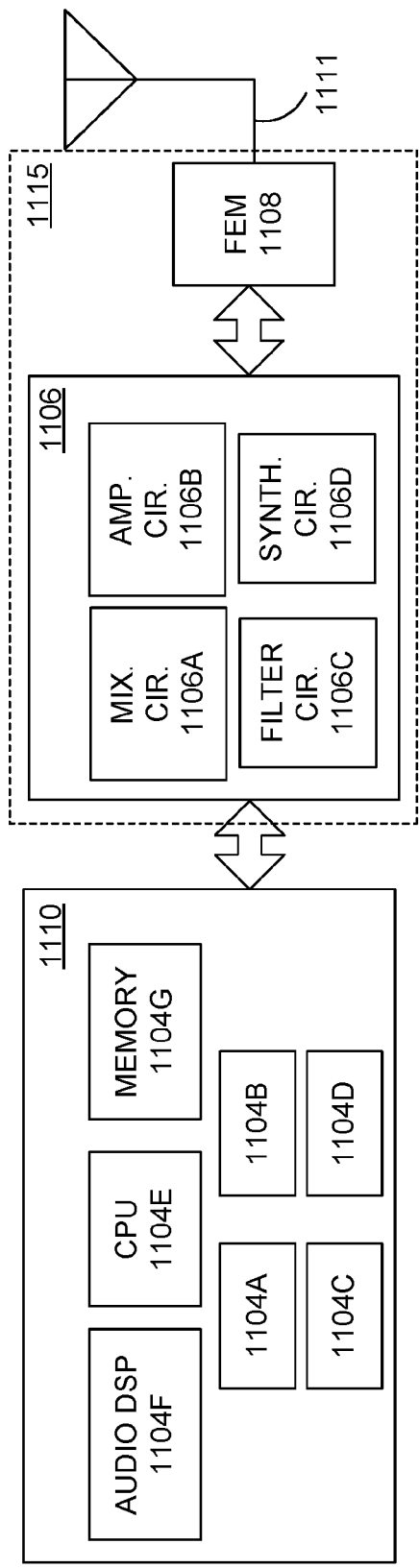
FIG. 11 depicts example components of baseband circuitry and radio frequency circuitry, in accordance with various embodiments.

FIG. 11 illustrates example components of baseband circuitry 1110 and radio front end modules (RFEM) 1115 in accordance with various embodiments. The baseband circuitry 1110 corresponds to the baseband circuitry 910 and 1010 of FIGS. 9 and 10, respectively. The RFEM 1115 corresponds to the RFEM 915 and 1015 of FIGS. 9 and 10, respectively. As shown, the RFEMs 1115 may include Radio Frequency (RF) circuitry 1106, front-end module (FEM) circuitry 1108, antenna array 1111 coupled together at least as shown.

The baseband circuitry 1110 includes circuitry and/or control logic configured to carry out various radio/network protocol and radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1110 may include Fast-Fourier Transform (FFT), precoding, or constellation mapping/demapping functionality. In some embodiments, encoding/decoding circuitry of the baseband circuitry 1110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1110 is configured to process baseband signals received from a receive signal path of the RF circuitry 1106 and to generate baseband signals for a transmit signal path of the RF circuitry 1106. The baseband circuitry 1110 is configured to interface with application circuitry 905/1005 (see FIGS. 9 and 10) for generation and processing of the baseband signals and for controlling operations of the RF circuitry 1106. The baseband circuitry 1110 may handle various radio control functions.

The aforementioned circuitry and/or control logic of the baseband circuitry 1110 may include one or more single or multi-core processors. For example, the one or more processors may include a 3G baseband processor 1104A, a 4G/LTE baseband processor 1104B, a 5G/NR baseband processor 1104C, or some other baseband processor(s) 1104D for other existing generations, generations in development or to be developed in the future (e.g., sixth generation (6G), etc.). In other embodiments, some or all of the functionality of baseband processors 1104A-D may be included in modules stored in the memory 1104G and executed via a Central Processing Unit (CPU) 1104E. In other embodiments, some or all of the functionality of baseband processors 1104A-D may be provided as hardware accelerators (e.g., FPGAs, ASICs, etc.) loaded with the appropriate bit streams or logic blocks stored in respective memory cells. In various embodiments, the memory 1104G may store program code of a real-time OS (RTOS), which when executed by the CPU 1104E (or other baseband processor), is to cause the CPU 1104E (or other baseband processor) to manage resources of the baseband circuitry 1110, schedule tasks, etc. Examples of the RTOS may include Operating System Embedded (OSE)™ provided by Eneak, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1110 includes one or more audio digital signal processor(s) (DSP) 1104F. The audio DSP(s) 1104F include elements for compression/decompression and echo cancellation and may include other suitable processing elements in other embodiments.

In some embodiments, each of the processors 1104A-1104E include respective memory interfaces to send/receive data to/from the memory 1104G. The baseband circuitry 1110 may further include one or more interfaces to communicatively couple to other circuitries/devices, such as an interface to send/receive data to/from memory external to the baseband circuitry 1110; an application circuitry interface to send/receive data to/from the application circuitry 905/1005 of FIGS. 9-11); an RF circuitry interface to send/receive data to/from RF circuitry 1106 of FIG. 11; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1025.

In alternate embodiments (which may be combined with the above described embodiments), baseband circuitry 1110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1110 may include protocol processing circuitry with one or more instances of control circuitry (not shown) to provide control functions for the digital baseband circuitry and/or radio frequency circuitry (e.g., the radio front end modules 1115).

Although not shown by FIG. 11, in some embodiments, the baseband circuitry 1110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1110 and/or RF circuitry 1106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1110 and/or RF circuitry 1106 are part of a Wi-Fi communication system. In the second example, the protocol processing circuitry would operate Wi-Fi MAC and logical link control (LLC) functions. The protocol processing circuitry may include one or more memory structures (e.g., 1104G) to store program code and data for operating the protocol functions, as well as one or more processing cores to execute the program code and perform various operations using the data. The baseband circuitry 1110 may also support radio communications for more than one wireless protocol.

The various hardware elements of the baseband circuitry 1110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1110 may be suitably combined in a single chip or chipset, or disposed on a same circuit board. In another example, some or all of the constituent components of the baseband circuitry 1110 and RF circuitry 1106 may be implemented together such as, for example, a system on a chip (SoC) or System-in-Package (SiP). In another example, some or all of the constituent components of the baseband circuitry 1110 may be implemented as a separate SoC that is communicatively coupled with and RF circuitry 1106 (or multiple instances of RF circuitry 1106). In yet another example, some or all of the constituent components of the baseband circuitry 1110 and the application circuitry 905/1005 may be implemented together as individual SoCs mounted to a same circuit board (e.g., a "multi-chip package").

In some embodiments, the baseband circuitry 1110 may provide for communication compatible with one or more radio technologies. For example, in some embodiments, the baseband circuitry 1110 may support communication with an E-UTRAN or other WMAN, a WLAN, a WPAN. Embodiments in which the baseband circuitry 1110 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path, which may include circuitry to down-convert RF signals received from the FEM circuitry 1108 and provide baseband signals to the baseband circuitry 1110. RF circuitry 1106 may also include a transmit signal path, which may include circuitry to up-convert baseband signals provided by the baseband circuitry 1110 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1110 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1110 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a of the transmit signal path may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1110 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1110 or the application circuitry 905/1005 depending on the desired output frequency. In some embodiments, a divider control input (e.g., N) may be determined from a look-up table based on a channel indicated by the application circuitry 905/1005.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path, which may include circuitry configured to operate on RF signals received from antenna array 1111, amplify the received signals and provide the amplified versions of the received signals to the RF circuitry 1106 for further processing. FEM circuitry 1108 may also include a transmit signal path, which may include circuitry configured to amplify signals for transmission provided by the RF circuitry 1106 for transmission by one or more of antenna elements of antenna array 1111. In various embodiments, the amplification through the transmit or receive signal paths may be done solely in the RF circuitry 1106, solely in the FEM circuitry 1108, or in both the RF circuitry 1106 and the FEM circuitry 1108.

In some embodiments, the FEM circuitry 1108 may include a TX/RX switch to switch between transmit mode and receive mode operation. The FEM circuitry 1108 may include a receive signal path and a transmit signal path. The receive signal path of the FEM circuitry 1108 may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission by one or more antenna elements of the antenna array 1111.

The antenna array 1111 comprises one or more antenna elements, each of which is configured convert electrical signals into radio waves to travel through the air and to convert received radio waves into electrical signals. For example, digital baseband signals provided by the baseband circuitry 1110 is converted into analog RF signals (e.g., modulated waveform) that will be amplified and transmitted via the antenna elements of the antenna array 1111 including one or more antenna elements (not shown). The antenna elements may be omnidirectional, direction, or a combination thereof. The antenna elements may be formed in a multitude of arranges as are known and/or discussed herein. The antenna array 1111 may comprise microstrip antennas or printed antennas that are fabricated on the surface of one or more printed circuit boards. The antenna array 1111 may be formed in as a patch of metal foil (e.g., a patch antenna) in a variety of shapes, and may be coupled with the RF circuitry 1106 and/or FEM circuitry 1108 using metal transmission lines or the like.

Processors of the application circuitry 905/1005 and processors of the baseband circuitry 1110 may be used to execute elements of one or more instances of a protocol stack. For example, processors of the baseband circuitry 1110, alone or in combination, may be used execute Layer 3, Layer 2, or Layer 1 functionality, while processors of the application circuitry 905/1005 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 12:
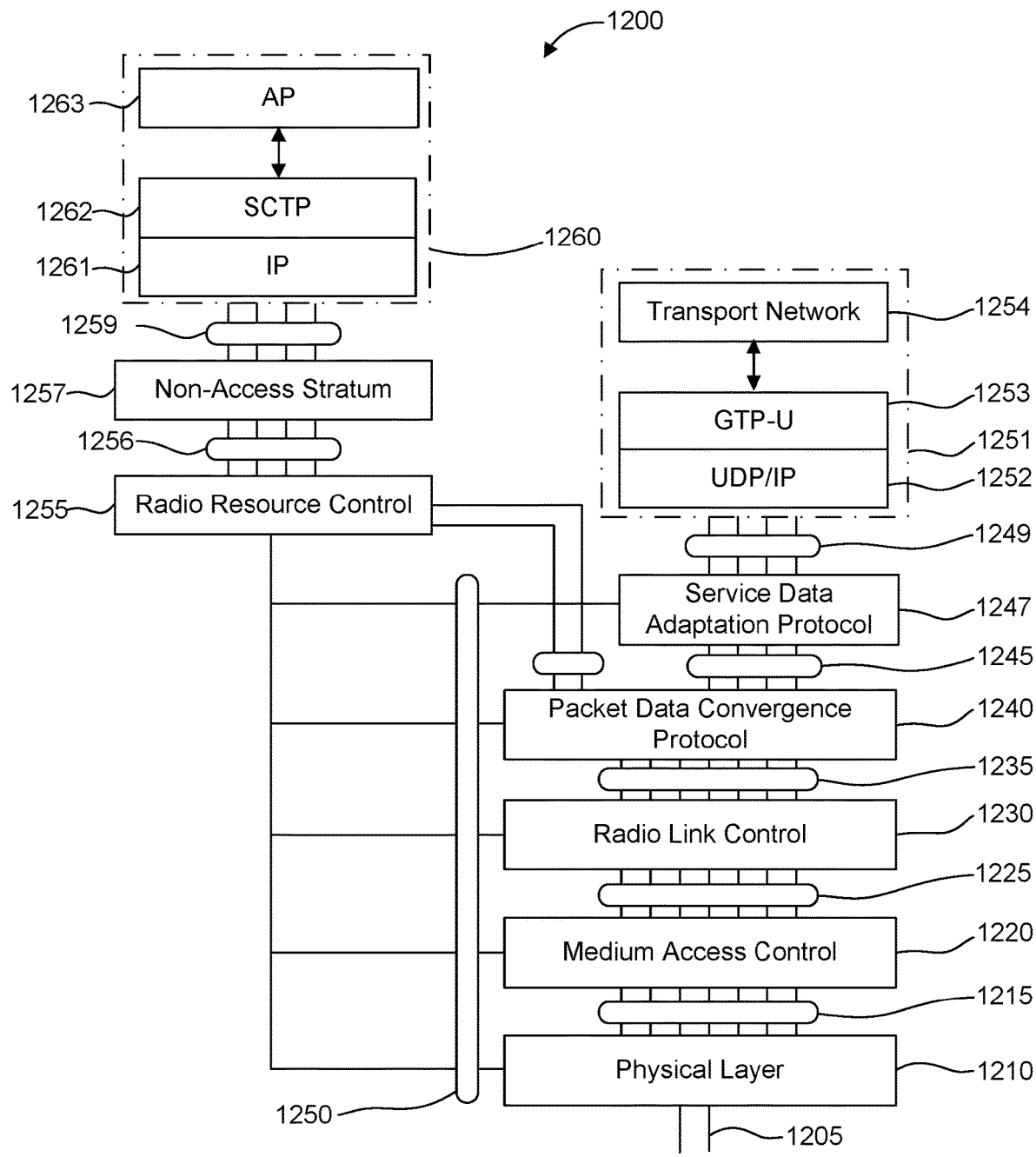
FIG. 12 is an illustration of various protocol functions that may be used for various protocol stacks, in accordance with various embodiments.

FIG. 12 illustrates various protocol functions that may be implemented in a wireless communication device according to various embodiments. In particular, FIG. 12 includes an arrangement 1200 showing interconnections between various protocol layers/entities. The following description of FIG. 12 is provided for various protocol layers/entities that operate in conjunction with the 5G/NR system standards and LTE system standards, but some or all of the aspects of FIG. 12 may be applicable to other wireless communication network systems as well.

The protocol layers of arrangement 1200 may include one or more of PHY 1210, MAC 1220, RLC 1230, PDCP 1240, SDAP 1247, RRC 1255, and NAS layer 1257, in addition to other higher layer functions not illustrated. The protocol layers may include one or more service access points (e.g., items 1259, 1256, 1250, 1249, 1245, 1235, 1225, and 1215 in FIG. 12) that may provide communication between two or more protocol layers.

The PHY 1210 may transmit and receive physical layer signals 1205 that may be received from or transmitted to one or more other communication devices. The physical layer signals 1205 may comprise one or more physical channels, such as those discussed herein. The PHY 1210 may further perform link adaptation or adaptive modulation and coding (AMC), power control, cell search (e.g., for initial synchronization and handover purposes), and other measurements used by higher layers, such as the RRC 1255. The PHY 1210 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1210 may process requests from and provide indications to an instance of MAC 1220 via one or more PHY-SAP 1215. According to some embodiments, requests and indications communicated via PHY-SAP 1215 may comprise one or more transport channels.

Instance(s) of MAC 1220 may process requests from, and provide indications to, an instance of RLC 1230 via one or more MAC-SAPs 1225. These requests and indications communicated via the MAC-SAP 1225 may comprise one or more logical channels. The MAC 1220 may perform mapping between the logical channels and transport channels, multiplexing of MAC SDUs from one or more logical channels onto TBs to be delivered to PHY 1210 via the transport channels, de-multiplexing MAC SDUs to one or more logical channels from TBs delivered from the PHY 1210 via transport channels, multiplexing MAC SDUs onto TBs, scheduling information reporting, error correction through HARQ, and logical channel prioritization.

Instance(s) of RLC 1230 may process requests from and provide indications to an instance of PDCP 1240 via one or more radio link control service access points (RLC-SAP) 1235. These requests and indications communicated via RLC-SAP 1235 may comprise one or more RLC channels. The RLC 1230 may operate in a plurality of modes of operation, including: Transparent Mode (TM), Unacknowledged Mode (UM), and Acknowledged Mode (AM). The RLC 1230 may execute transfer of upper layer protocol data units (PDUs), error correction through automatic repeat request (ARQ) for AM data transfers, and concatenation, segmentation and reassembly of RLC SDUs for UM and AM data transfers. The RLC 1230 may also execute resegmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1240 may process requests from and provide indications to instance(s) of RRC 1255 and/or instance(s) of SDAP 1247 via one or more packet data convergence protocol service access points (PDCP-SAP) 1245. These requests and indications communicated via PDCP-SAP 1245 may comprise one or more radio bearers. The PDCP 1240 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1247 may process requests from and provide indications to one or more higher layer protocol entities via one or more SDAP-SAP 1249. These requests and indications communicated via SDAP-SAP 1249 may comprise one or more QoS flows. The SDAP 1247 may map QoS flows to DRBs, and vice versa, and may also mark QFIs in DL and UL packets. A single SDAP entity 1247 may be configured for an individual PDU session. In the UL direction, the NG-RAN 610 may control the mapping of QoS Flows to DRB(s) in two different ways, reflective mapping or explicit mapping. For reflective mapping, the SDAP 1247 of a UE 601 may monitor the QFIs of the DL packets for each DRB, and may apply the same mapping for packets flowing in the UL direction. For a DRB, the SDAP 1247 of the UE 601 may map the UL packets belonging to the QoS flows(s) corresponding to the QoS flow ID(s) and PDU session observed in the DL packets for that DRB. To enable reflective mapping, the NG-RAN 810 may mark DL packets over the Uu interface with a QoS flow ID. The explicit mapping may involve the RRC 1255 configuring the SDAP 1247 with an explicit QoS flow to DRB mapping rule, which may be stored and followed by the SDAP 1247. In embodiments, the SDAP 1247 may only be used in NR implementations and may not be used in LTE implementations.

The RRC 1255 may configure, via one or more management service access points (M-SAP), aspects of one or more protocol layers, which may include one or more instances of PHY 1210, MAC 1220, RLC 1230, PDCP 1240 and SDAP 1247. In embodiments, an instance of RRC 1255 may process requests from and provide indications to one or more NAS entities 1257 via one or more RRC-SAPS 1256. The main services and functions of the RRC 1255 may include broadcast of system information (e.g., included in MIBs or SIBs related to the NAS), broadcast of system information related to the access stratum (AS), paging, establishment, maintenance and release of an RRC connection between the UE 601 and RAN 610 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1257 may form the highest stratum of the control plane between the UE 601 and the AMF 821. The NAS 1257 may support the mobility of the UEs 601 and the session management procedures to establish and maintain IP connectivity between the UE 601 and a P-GW in LTE systems.

According to various embodiments, one or more protocol entities of arrangement 1200 may be implemented in UEs 601, RAN nodes 611, AMF 821 in NR implementations or MME 721 in LTE implementations, UPF 802 in NR implementations or S-GW 722 and P-GW 723 in LTE implementations, or the like to be used for control plane or user plane communications protocol stack between the aforementioned devices. In such embodiments, one or more protocol entities that may be implemented in one or more of UE 601, gNB 611, AMF 821, etc. may communicate with a respective peer protocol entity that may be implemented in or on another device using the services of respective lower layer protocol entities to perform such communication. In some embodiments, a gNB-CU of the gNB 611 may host the RRC 1255, SDAP 1247, and PDCP 1240 of the gNB that controls the operation of one or more gNB-DUs, and the gNB-DUs of the gNB 611 may each host the RLC 1230, MAC 1220, and PHY 1210 of the gNB 611.

In a first example, a control plane protocol stack may comprise, in order from highest layer to lowest layer, NAS 1257, RRC 1255, PDCP 1240, RLC 1230, MAC 1220, and PHY 1210. In this example, upper layers 1260 may be built on top of the NAS 1257, which includes an IP layer 1261, an SCTP 1262, and an application layer signaling protocol (AP) 1263.

In NR implementations, the AP 1263 may be an NG application protocol layer (NGAP or NG-AP) 1263 for the NG interface 613 defined between the NG-RAN node 611 and the AMF 821, or the AP 1263 may be an Xn application protocol layer (XnAP or Xn-AP) 1263 for the Xn interface 612 that is defined between two or more RAN nodes 611.

The NG-AP 1263 may support the functions of the NG interface 613 and may comprise Elementary Procedures (EPs). An NG-AP EP may be a unit of interaction between the NG-RAN node 611 and the AMF 821. The NG-AP 1263 services may comprise two groups: UE-associated services (e.g., services related to a UE 601) and non-UE-associated services (e.g., services related to the whole NG interface instance between the NG-RAN node 611 and AMF 821). These services may include functions including, but not limited to: a paging function for the sending of paging requests to NG-RAN nodes 611 involved in a particular paging area; a UE context management function for allowing the AMF 821 to establish, modify, and/or release a UE context in the AMF 821 and the NG-RAN node 611; a mobility function for UEs 601 in ECM-CONNECTED mode for intra-system HOs to support mobility within NG-RAN and inter-system HOs to support mobility from/to EPS systems; a NAS Signaling Transport function for transporting or rerouting NAS messages between UE 601 and AMF 821; a NAS node selection function for determining an association between the AMF 821 and the UE 601; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 611 via CN 620; and/or other like functions.

The XnAP 1263 may support the functions of the Xn interface 612 and may comprise XnAP basic mobility procedures and. XnAP global procedures. The XnAP basic mobility procedures may comprise procedures used to handle UE mobility within the NG RAN 611 (or E-UTRAN 710), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 601, such as Xn interface setup and reset procedures, NG-RAN update procedures, cell activation procedures, and the like.

In LTE implementations, the AP 1263 may be an S1 Application Protocol layer (S1-AP) 1263 for the S1 interface 613 defined between an E-UTRAN node 611 and an MME, or the AP 1263 may be an X2 application protocol layer (X2AP or X2-AP) 1263 for the X2 interface 612 that is defined between two or more E-UTRAN nodes 611.

The S1 Application Protocol layer (S1-AP) 1263 may support the functions of the S1 interface, and similar to the NG-AP discussed previously, the S1-AP may comprise S1-AP EPs. An S1-AP EP may be a unit of interaction between the E-UTRAN node 611 and an MME 721 within an LTE CN 620. The S1-AP 1263 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1263 may support the functions of the X2 interface 612 and may comprise X2AP basic mobility procedures and X2AP global procedures. The X2AP basic mobility procedures may comprise procedures used to handle UE mobility within the E-UTRAN 620, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 601, such as X2 interface setup and reset procedures, load indication procedures, error indication procedures, cell activation procedures, and the like.

The SCTP layer (alternatively refereed to as the SCTP/IP layer) 1262 may provide guaranteed delivery of application layer messages (e.g., NGAP or XnAP messages in NR implementations, or S1-AP or X2AP messages in LTE implementations). The SCTP 1262 may ensure reliable delivery of signaling messages between the RAN node 611 and the AMF 821/MME 721 based, in part, on the IP protocol, supported by the IP 1261. The Internet Protocol layer (IP) 1261 may be used to perform packet addressing and routing functionality. In some implementations the IP layer 1261 may use point-to-point transmission to deliver and convey PDUs. In this regard, the RAN node 611 may comprise L2 and L1 layer communication links (e.g., wired or wireless) with the MME/AMF to exchange information.

In a second example, a user plane protocol stack may comprise, in order from highest layer to lowest layer, SDAP 1247, PDCP 1240, RLC 1230, MAC 1220, and PHY 1210. The user plane protocol stack may be used for communication between the UE 601, the RAN node 611, and UPF 802 in NR implementations or an S-GW 722 and P-GW 723 in LTE implementations. In this example, upper layers 1251 may be built on top of the SDAP 1247, and may include a user datagram protocol (UDP) and IP security layer (UDP/IP) 1252, a General Packet Radio Service (GPRS) Tunneling Protocol for the user plane layer (GTP-U) 1253, and a User Plane PDU layer (UP PDU) 1263.

The transport network layer 1254 (also referred to as a "transport layer") may be built on IP transport, and the GTP-U 1253 may be used on top of the UDP/IP layer 1252 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1253 may be used for carrying user data within the GPRS core network and between the radio access network and the core network. The user data transported can be packets in any of IPv4, IPv6, or PPP formats, for example. The UDP/IP 1252 may provide checksums for data integrity, port numbers for addressing different functions at the source and destination, and encryption and authentication on the selected data flows. The RAN node 611 and the S-GW 722 may utilize an S1-U interface to exchange user plane data via a protocol stack comprising an L1 layer (e.g., PHY 1210), an L2 layer (e.g., MAC 1220, RLC 1230, PDCP 1240, and/or SDAP 1247), the UDP/IP layer 1252, and the GTP-U 1253. The S-GW 722 and the P-GW 723 may utilize an S5/S8a interface to exchange user plane data via a protocol stack comprising an L1 layer, an L2 layer, the UDP/IP layer 1252, and the GTP-U 1253. As discussed previously, NAS protocols may support the mobility of the UE 601 and the session management procedures to establish and maintain IP connectivity between the UE 601 and the P-GW 723.

Moreover, although not shown by FIG. 12, an application layer may be present above the AP 1263 and/or the transport network layer 1254. The application layer may be a layer in which a user of the UE 601, RAN node 611, or other network element interacts with software applications being executed, for example, by application circuitry 905 or application circuitry 1005, respectively. The application layer may also provide one or more interfaces for software applications to interact with communications systems of the UE 601 or RAN node 611, such as the baseband circuitry 1110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 13:
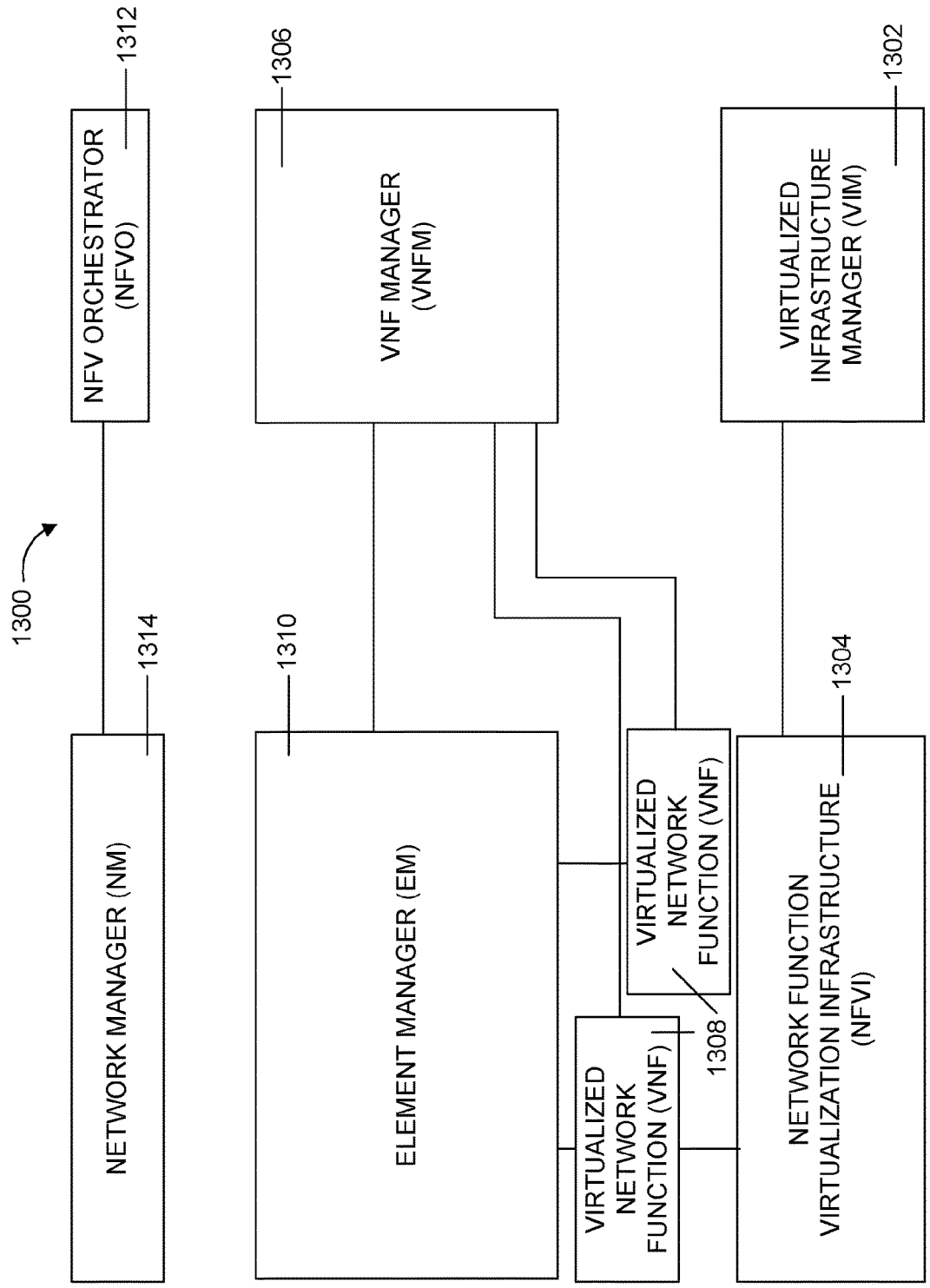
FIG. 13 is a block diagram illustrating components of a system to support NFV, in accordance with various embodiments.

FIG. 13 is a block diagram illustrating components, according to some example embodiments, of a system 1300 to support NFV. The system 1300 is illustrated as including a VIM 1302, an NFVI 1304, an VNFM 1306, VNFs 1308, an EM 1310, an NFVO 1312, and a NM 1314.

The VIM 1302 manages the resources of the NFVI 1304. The NFVI 1304 can include physical or virtual resources and applications (including hypervisors) used to execute the system 1300. The VIM 1302 may manage the life cycle of virtual resources with the NFVI 1304 (e.g., creation, maintenance, and tear down of VMs associated with one or more physical resources), track VM instances, track performance, fault and security of VM instances and associated physical resources, and expose VM instances and associated physical resources to other management systems.

The VNFM 1306 may manage the VNFs 1308. The VNFs 1308 may be used to execute EPC components/functions.

The VNFM 1306 may manage the life cycle of the VNFs 1308 and track performance, fault and security of the virtual aspects of VNFs 1308. The EM 1310 may track the performance, fault and security of the functional aspects of VNFs 1308. The tracking data from the VNFM 1306 and the EM 1310 may comprise, for example, PM data used by the VIM 1302 or the NFVI 1304. Both the VNFM 1306 and the EM 1310 can scale up/down the quantity of VNFs of the system 1300.

The NFVO 1312 may coordinate, authorize, release and engage resources of the NFVI 1304 in order to provide the requested service (e.g., to execute an EPC function, component, or slice). The NM 1314 may provide a package of end-user functions with the responsibility for the management of a network, which may include network elements with VNFs, non-virtualized network functions, or both (management of the VNFs may occur via the EM 1310).

Figure 14:
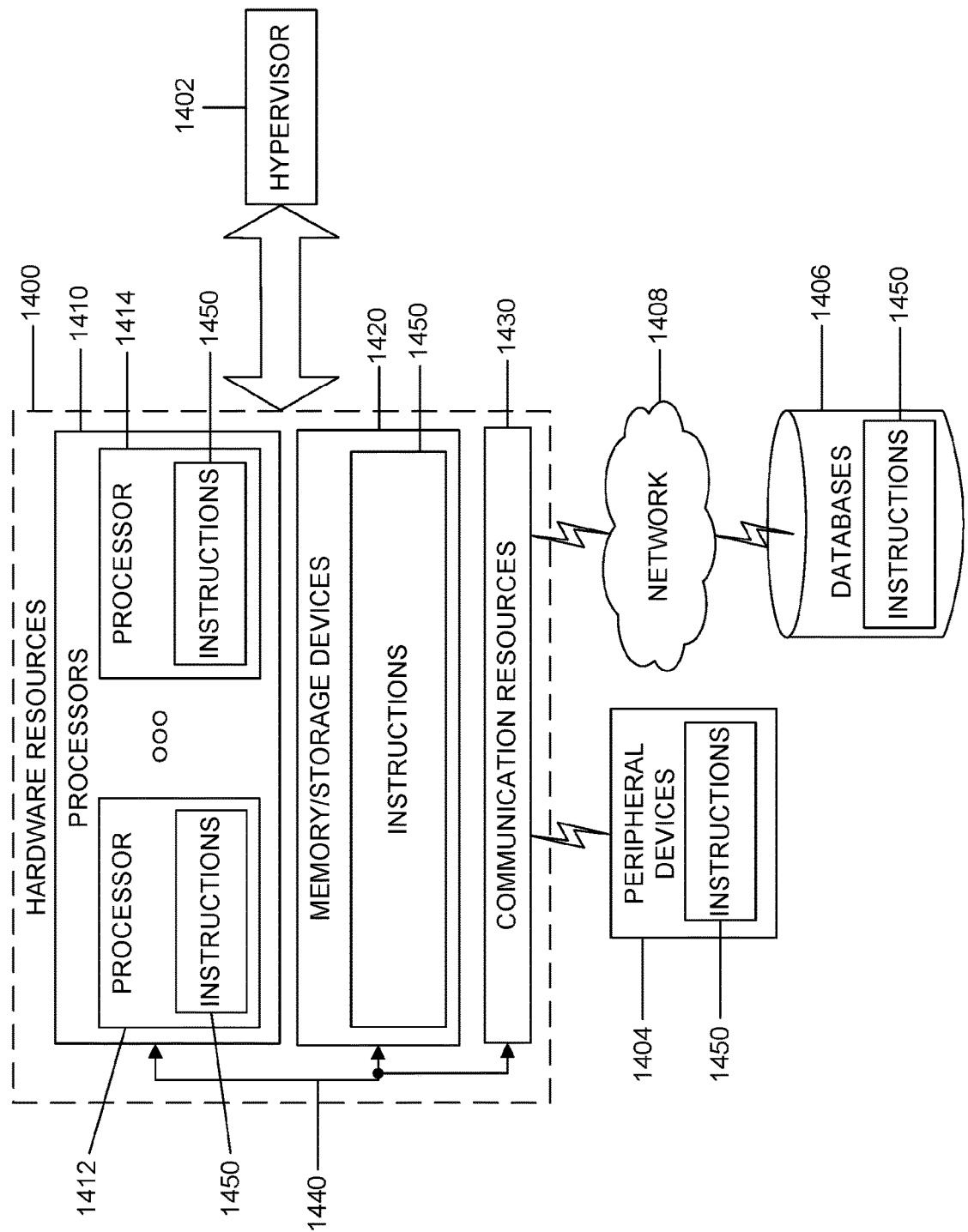
FIG. 14 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processor(s) 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via USB), cellular communication components, NFC components, Bluetooth® (or Bluetooth® Low Energy) components, Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Example Procedures

Figure 15:
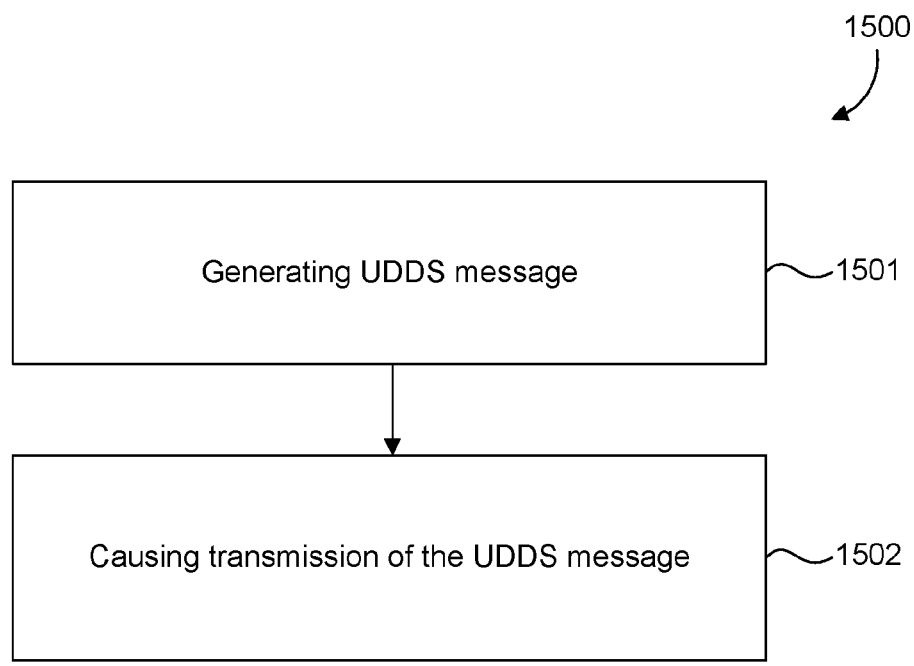
FIG. 15 depicts an example flowchart for practicing the various embodiments discussed herein, for example, generating and transmitting a UDDS message.

In some embodiments, the electronic device(s), network(s), system(s), chip(s) or component(s), or portions or implementations thereof, of FIGS. 6-14, or some other figure herein, may be configured to perform one or more processes, techniques, or methods as described herein, or portions thereof. One such process is depicted in FIG. 15. For example, the process may include, at 1501, generating a UDDS message. In some embodiments, the donor node, or components thereof, may generate the UDDS message. The UDDS message may include an indication of a lost uplink packet or a last successfully delivered uplink packet. The UDDS message may be an RRC message, an F1-AP message, or an F1-U PDU message. The process may further include, at 1502, causing transmission of the UDDS message. In some embodiments, causing transmission may include the control circuitry of the donor node controlling transceiver or other networking circuitry of the donor node to transmit the message using an appropriate networking protocol. The UDDS message may be transmitted to a serving relay node as described above.

Figure 16:
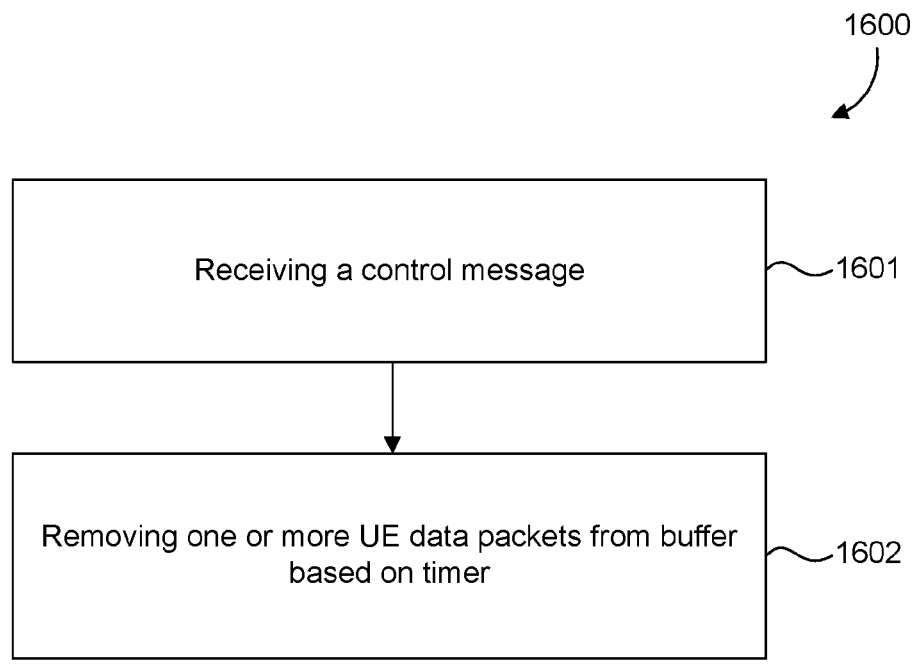
FIG. 16 depicts an example flowchart for practicing the various embodiments discussed herein, for example, receiving an control message.

In some embodiments, the electronic device(s), network (s), system(s), chip(s) or component(s), or portions or implementations thereof, of FIGS. 6-14, or some other figure herein, may be configured to perform one or more processes, techniques, or methods as described herein, or portions thereof. One such process is depicted in FIG. 16. For example, the process may include, at 1601, receiving a control message. In some embodiments, to receive the control message, the serving relay node may process the control message by performing one or more receive processing techniques such as, but not limited to, decoding, demodulating, de-mapping, etc. upon successful receipt of the control message, the serving relay node may extract configuration information that configures an uplink retransmission timer. The value may indicate a maximum time that the relay node is to keep a UE's uplink data packet in its buffer. The relay node may set the timer based on the value configured in the control message. The process may further include, at 1602, removing one or more UE data packets from a buffer of the relay node based on expiration of the timer.

For one or more embodiments, at least one of the components set forth in one or more of the preceding figures may be configured to perform one or snore operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of supporting centralized retransmission in a multi-hop relay network.

Example 2 may include a method comprising causing transmission of a control UDDS (uplink data delivery status) message from a donor node to a serving relay node to report a lost uplink packet or a last successfully delivered uplink packet.

Example 3 may include the method of example 2 or some other example herein, wherein the UDDS message is in a format of an RRC message, an F1-AP message, or a F1-U PDU message.

Example 4 may include a method comprising causing transmission of a UDDS (F1 PDU) message, by a donor node, and reporting lost packets (or last successfully delivered packet) when a topology changes (for example, due to a backhaul link failure).

Example 5 may include a method comprising causing transmission of a UDDS (e.g., F1 PDU) message, by a donor node, to report last successfully delivered packet.

Example 6 may include the method of example 5 or some other example, further comprising: causing periodic transmission of UDDS messages to report last successfully delivered packet.

Example 7 may include a method of operating a serving relay node, the method comprising receiving and processing a UDDS (e.g., F1 PDU) message from a donor node to determine a last successfully delivered packet; and removing one or more UE data packets that have already been delivered from a buffer.

Example 8 may include a method of operating a relay node, the method comprising: removing one or more UE data packets from a buffer based on a timer (e.g., an uplink retransmission timer that is to indicate a maximum time that the relay node will keep a UE's uplink data packet in its buffer).

Example 9 may include the method of example 8 or some other example herein, further comprising receiving, from a donor node, a control message (e.g., F1-AP, RRC, etc.) to configure the timer.

Example 10 may include a method of operating a relay node, the method comprising: buffering uplink data for one or more UEs that are served by the relay node; and retransmitting uplink data via a new path during a backhaul link failure.

Example 11 may include a method of operating a relay node, the method comprising: receiving packets from a UE; buffering the received packets and forwarding the received packets, wherein the forwarding includes adding a header that includes routing information for a first route; receiving an indication of a route change from the first route to a second route; and forwarding a subset of the buffered received packets, wherein the forwarding includes adding a header that includes routing information for the second route.

Example 12 may include the method of example 11 or some other example herein, further comprising: receiving an indication of missing data from a central node, wherein forwarding the subset of buffered received packets comprises forwarding buffered packets corresponding to the missing data.

Example 13 may include a method of operating a donor node, the method comprising generating a control uplink data delivery status (UDDS) message with an indication of a lost uplink packet or a last successfully delivered uplink packet; causing transmission of the UDDS message to a serving relay node.

Example 14 may include the method of example 13 or some other example herein, wherein the UDDS message is an RRC message, an F1-AP message, or an F1-U PDU message.

Example 15 may include the method of example 13 or some other example herein, further comprising detecting a change in a topology (for example, due to a backhaul link failure) and generating and causing transmission of the UDDS message based on said detecting of the change.

Example 16 may include the method of example 13 or some other example herein, wherein the UDDS message is to include the indication of the last successfully delivered packet and the method further comprises causing periodic transmission of UDDS messages to report last successfully delivered packets.

Example 17 may include the method of example 13 or some other example herein, wherein the indication is an indication of one or more lost F1-U sequence numbers.

Example 18 may include the method of example 13 or some other example herein, wherein the UDDS message is a first UDDS message, the serving relay node is a first serving relay node, and the method further comprises: generating and causing transmission of a second UDDS message to a second serving relay node, the second UDDS message to include an indication of a radio link outage.

Example 19 may include a method of operating a donor node, the method comprising: generating a control message with an indication of a value to configure an uplink retransmission timer; and causing transmission of the control message to a relay node.

Example 20 may include the method of example 19 or some other example herein, wherein the value is to indicate a maximum time that the relay node is keep a UE's uplink data packet in its buffer.

Example 21 may include the method of example 19 or some other example herein, wherein the control message is an F1-AP message or an RRC signal.

Example Z01 may include an apparatus comprising means to perform one or more elements of a method described in or related to any of examples 1-20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example Z03 may include an apparatus comprising logic, modules, or circuitry to perform one or more elements of a method described in or related to any of examples 1-20, or any other method or process described herein.

Example Z04 may include a method, technique, or process as described in or related to any of examples 1-20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example Z06 may include a signal as described in or related to any of examples 1-Z05, or portions or parts thereof.

Example Z07 may include a signal in a wireless network as shown and described herein.

Example Z08 may include a method of communicating in a wireless network as shown and described herein.

Example Z09 may include a system for providing wireless communication as shown and described herein.

Example Z10 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein, but are not meant to be limiting.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based. Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMOS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
CR Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area. Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Channel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signaling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary identity
GERAN GSM EDGE RAN, GSM EDGE Radio Access Network
GGSN Gateway GPRS Support Node
GLONASS GLObalinaya NAvigatsionnaya. Sputnikovaya Sistema Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunneling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land. Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE information element
IBE In-Band Emission
IEEE Institute of Electrical and Electronics Engineers
IEI Information Element Identifier
IEIDL Information Element identifier Data Length
IETF Internet Engineering Task Force
IF infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP integration Reference Point
ISDN Integrated Services Digital Network
ISM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signaling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged. Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point identifier
SCC Secondary Component Carrier, Secondary CC
SCell Secondary Cell
SC-TDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signaling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modeling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. A method of uplink (UL) recovery in a wireless network, comprising:
   receiving, at a central unit (CU) node, uplink transmissions originating from a user equipment (UE) via a backhaul relay including a first distributed unit (DU) node and a second DU node;
   receiving, at the CU node from the second DU node, a first UL status message associated with a link failure between the first DU node and the second DU node;
   generating, by the CU node, a second UL status message indicating a sequence number (SN) of a lost packet caused by the link failure or a SN of a last successfully received packet before the link failure; and
   transmitting, by the CU node, the second UL status message to the first DU node,
   wherein the second UL status message includes instructions for the first DU node to send subsequent UL transmissions to a third DU node, instead of the second DU node, for further upload to the CU node.

2. The method of claim 1, further comprising receiving the subsequent UL transmissions from the third DU node.

3. The method of claim 1, wherein the second UL status message is transmitted to the first DU node via the third DU node.

4. The method of claim 1, wherein the first UL status message is received from the second DU node and includes at least one of the SN of the lost packet caused by the link failure or the SN of the last successfully received packet before the link failure.

5. The method of claim 1, wherein at least one of the first UL message or the second UL message is based on a F1 interface protocol associated with 5G.

6. The method of claim 1, wherein the second UL status message further includes a UL transmission timer that indicates a storage time that the first DL node should store UL transmissions from the UE.

7. A non-transitory computer readable medium having instructions stored thereon that, when executed by one or more processors of a central unit (CU) node, cause the CU node to perform operations, the operations comprising:
   receiving, at the central unit (CU) node, uplink transmissions originating from a user equipment (UE) via a backhaul relay including a first distributed unit (DU) node and a second DU node;
   receiving, at the CU node from the second DU node, a first UL status message associated with a link failure between the first DU node and the second DU node;
   generating, by the CU node, a second UL status message indicating a sequence number (SN) of a lost packet caused by the link failure or a SN of a last successfully received packet before the link failure; and
   transmitting, by the CU node, the second UL status message to the first DU node,
   wherein the second UL status message includes instructions for the first DU node to send subsequent UL transmissions to a third DU node, instead of the second DU node, for further upload to the CU node.

8. The non-transitory computer readable medium of claim 7, wherein the operations further comprise receiving the subsequent UL transmissions from the third DU node.

9. The non-transitory computer readable medium of claim 7, wherein the second UL status message is transmitted to the first DU node via the third DU node.

10. The non-transitory computer readable medium of claim 7, wherein the first UL status message is received from the second DU node and includes at least one of the SN of the lost packet caused by the link failure or the SN of the last successfully received packet before the link failure.

11. The non-transitory computer readable medium of claim 7, wherein at least one of the first UL message or the second UL message is based on a F1 interface protocol associated with 5G.

12. The non-transitory computer readable medium of claim 7, wherein the second UL status message further includes a UL transmission timer that indicates a storage time that the first DL node should store UL transmissions from the UE.

13. A central unit (CU) node, comprising:
   radio front end circuitry configured to perform wireless communication over a wireless network; and
   processor circuitry, coupled to the radio front end circuitry, configured to:
      receive uplink transmissions originating from a user equipment (UE) via a backhaul relay including a first distributed unit (DU) node and a second DU node;
      receive from the second DU node a first UL status message associated with a link failure between the first DU node and the second DU node;
      generate a second UL status message indicating a sequence number (SN) of a lost packet caused by the link failure or a SN of a last successfully received packet before the link failure; and
      transmit, using the radio front end circuitry, the second UL status message to the first DU node,
      wherein the second UL status message includes instructions for the first DU node to send subsequent UL transmissions to a third DU node, instead of the second DU node, for further upload to the CU node.

14. The CU node of claim 13, wherein the second UL status message further includes:
   a UL transmission timer that indicates a storage time that the first DL node should store UL transmissions from the UE.

15. The CU node of claim 14, wherein the subsequent UL transmissions are received from third DU node.

16. The CU node of claim 14, wherein the second UL status message is transmitted to the first DU node via the third DU node.

17. The CU node of claim 13, wherein the first UL status message is received from the second DU node and includes at least one of the SN of the lost packet caused by the link failure or the SN of the last successfully received packet before the link failure.

18. The CU node of claim 13, wherein at least one of the first UL message or the second UL message is based on a F1 interface protocol associated with 5G.

* * * * *